(12) United States Patent
Salmon et al.

(10) Patent No.: US 9,383,967 B2
(45) Date of Patent: Jul. 5, 2016

(54) ACCUMULATION OF WAVEFORM DATA USING ALTERNATING MEMORY BANKS

(71) Applicant: NATIONAL INSTRUMENTS CORPORATION, Austin, TX (US)

(72) Inventors: Anita L. Salmon, Austin, TX (US); Jeff A. Bergeron, Austin, TX (US); Andrew C. Thomson, Austin, TX (US)

(73) Assignee: National Instruments Corporation, Austin, TX (US)

( * ) Notice: Subject to any disclaimer, the term of this patent is extended or adjusted under 35 U.S.C. 154(b) by 501 days.

(21) Appl. No.: 14/026,167

(22) Filed: Sep. 13, 2013

(65) Prior Publication Data

US 2014/0075080 A1 Mar. 13, 2014

Related U.S. Application Data

(60) Provisional application No. 61/700,818, filed on Sep. 13, 2012.

(51) Int. Cl.
| H03M 1/12 | (2006.01) |
| G06F 5/06 | (2006.01) |
| G06F 13/16 | (2006.01) |
| G06F 13/28 | (2006.01) |
| G06F 5/16 | (2006.01) |

(52) U.S. Cl.
CPC ........ *G06F 5/065* (2013.01); *G06F 5/16* (2013.01); *G06F 13/1647* (2013.01); *G06F 13/28* (2013.01)

(58) Field of Classification Search
CPC ....... G06F 5/065; G06F 5/16; G06F 13/1647; G06F 13/28
USPC ................................................. 341/155, 156
See application file for complete search history.

(56) References Cited

U.S. PATENT DOCUMENTS

| 6,252,572 | B1 | 6/2001 | Kurumisawa et al. |
| 6,859,209 | B2 | 2/2005 | Lavelle et al. |
| 6,906,720 | B2 | 6/2005 | Emberling et al. |
| 7,772,550 | B2 | 8/2010 | Schaefer et al. |
| 7,903,776 | B2 * | 3/2011 | Ishida .............. G01R 31/31709 375/371 |
| 2003/0050781 | A1 * | 3/2003 | Tamura .................... G10H 1/08 704/267 |
| 2006/0225561 | A1 * | 10/2006 | Kobayashi ....... G11B 20/10527 84/604 |

* cited by examiner

*Primary Examiner* — Jean B Jeanglaude
(74) *Attorney, Agent, or Firm* — Meyertons Hood Kivlin Kowert & Goetzel, P.C.; Jeffrey C. Hood; Mark S. Williams

(57) ABSTRACT

System and method for hardware implemented accumulation of waveform data. A digitizer is provided that includes: a circuit, and first and second memory banks, coupled to the circuit. The circuit may be configured to: store a first subset of the waveforms in the first memory bank, accumulate each waveform in a chunk-wise manner, where each chunk has a specified size, thereby generating a first bank sum including a first partial accumulation of the set of waveforms, store a second subset of waveforms in the second memory bank concurrently with the accumulation, and accumulate each waveform of the second subset of waveforms in a chunk-wise manner, thereby generating a second bank sum including a second partial accumulation of the set of waveforms, where the first and second partial accumulations of the set of waveforms are useable to generate an accumulated record of the set of waveforms.

19 Claims, 24 Drawing Sheets

US 9,383,967 B2

ACCUMULATION OF WAVEFORM DATA USING ALTERNATING MEMORY BANKS

PRIORITY DATA

This application claims benefit of priority to U.S. Provisional Application Ser. No. 61/700,818, titled "Hardware Implemented Chunk Based Accumulation of Waveform Data", filed Sep. 13, 2012, whose inventors were Anita L. Salmon, Jeff A. Bergeron, Rafael Castro Scorsi, and Andrew C. Thomson, and which is hereby incorporated by reference as though fully and completely set forth herein.

FIELD OF THE INVENTION

The present invention relates to data acquisition, and more specifically to hardware implemented chunk based accumulation of multiple digital waveforms.

DESCRIPTION OF THE RELATED ART

Data acquisition is a critical part of many processes and applications, and digital acquisition of analog waveforms, in which analog waveform data are digitized (by a digitizer) and stored, is a common feature.

Some prior art digitizers offer on-board accumulation of multiple waveforms. FIG. 1 is a high level block diagram of a digitizer, according to the prior art. As shown, this particular device is for use in PCI systems, and is implemented via programmable hardware, specifically, a field programmable gate array (FPGA) implementing various components. Note that while some specific exemplary embodiments are described herein as using FPGAs, in general, any type of programmable hardware element(s) may be used as desired.

As may be seen, analog data are received and converted to digital form by analog/digital converters (ADC) on the left side of the figure, and the resulting digital data are processed by respective components for (optional) data inversion, threshold/digital offset, e.g., for noise suppression, and peak detection, then summing components for performing fast partial sums, specifically, for generating and combining partial sums or accumulations, respectively. The fast partial sums are provided to (deep) onboard memory for storage until such time as the final sum is requested by the user via software. On demand, the fast partial sums are retrieved from onboard memory and combined to produce a final sum. The resulting data are then exported via a PCI interface and bus, e.g., to a host device, etc.

Such prior art device have notable shortcomings, including, for example, issues related to the following:

Inter-record dead time (or interval)—the time from the acquisition of the final sample of the final waveform of one accumulated record until the digitizer is able to respond to a subsequent trigger and acquire the first waveform of the next accumulated record, specified either as a time or as a duty cycle. During this interval, the digitizer is "blind" to triggers, and the corresponding measurement data is not included in any accumulated record. This could be due to memory access times, bus traffic delays, trigger circuit rearming, etc. In the prior art, this time is typically on the order of 1 ms+ and is dependent on waveform length. These waveforms are missed and not included in the accumulated records, which has undesirable implications for end-applications, especially applications requiring high sensitivity measurements of low amplitude signals and applications measuring/searching for intermittent events;

Streaming—prior art digitizers do not offer the ability to continuously stream accumulated data out at the same rate as it is being produced;

Number of waveforms per accumulated record—there are limitations on the number of waveforms that can be summed into one accumulated record, e.g., requiring this parameter to be specified in terms of a fixed multiple (value); and Waveform length—there are limitations on the waveform length that can be accumulated, e.g., due to block RAM limitations.

Accordingly, improved systems and methods for accumulating waveform data are desired.

SUMMARY OF THE INVENTION

Various embodiments are presented of a system and method for hardware implemented acquisition and chunk based accumulation of waveform data.

In one embodiment of a method for accumulating waveform data, a digitizer may be provided, including a circuit, e.g., an application specific integrated circuit (ASIC) or a programmable hardware element, a first memory bank, coupled to the circuit, and a second memory bank, coupled to the circuit. The circuit may be configured to accumulate a set of waveforms by: a) storing a first subset of the waveforms in the first memory bank, b) accumulating each waveform of the first subset of waveforms in a chunk-wise manner, wherein each chunk has a specified size, thereby generating a first bank sum comprising a first partial accumulation of the set of waveforms, c) storing a second subset of waveforms in the second memory bank concurrently with b), and d) accumulating each waveform of the second set of waveforms in a chunk-wise manner, thereby generating a second bank sum comprising a second partial accumulation of the set of waveforms. In one embodiment, the circuit may be further configured to perform e) accumulating the first and second bank sums into a running accumulation of the set of waveforms, and f) repeating a)-e) for successive further first and second subsets of the set of waveforms, thereby generating an accumulated record of the set of waveforms.

In some embodiments, the method may (or the circuit may be configured to) accumulate and store waveform data in alternating memory banks in a hardware based chunkwise manner by:

a) storing a first chunk of a first waveform of a first set of waveforms in a first memory buffer of the first memory bank (of the digitizer), b) storing a second chunk of the first waveform in a first memory buffer of a second memory bank (of the digitizer), and c) repeating a)-b) respectively for successive pairs of further chunks of the first waveform, thereby storing the first waveform in chunks alternating between successive buffers in the first and second memory banks Concurrently with c), the method may further perform: d) transferring the first chunk stored in first memory buffer of the first memory bank to a first FIFO, and e) transferring the second chunk stored in the first memory buffer of the second memory bank to a second FIFO.

In some embodiment, the method may further include: f) accumulating a first chunk of a second waveform of the first set of waveforms with the first chunk of the first waveform stored in the first FIFO and store in the first memory buffer of the first memory bank, g) accumulating a second chunk of the second waveform with the second chunk of the first waveform stored in the second FIFO and store in the first memory buffer of the second memory bank, and concurrently with g), h) transferring a first chunk of a first successive pair of the further chunks of the first waveform from a second buffer of the first memory bank into the first FIFO.

In one embodiment, the method may also include: i) accumulating a first chunk of a first successive pair of further chunks of the second waveform with the first chunk of the first successive pair of the further chunks of the first waveform stored in the first FIFO and store in the second memory buffer of the first memory bank, and concurrently with i), j) transferring a second chunk of the first successive pair of further chunks of the first waveform from the second buffer of the second memory bank into the second FIFO.

The method may further include: k) repeating g)-j) for further successive pairs of chunks of the second waveform using respective successive buffers of the first and second memory banks, thereby generating an accumulated record of the first and second waveforms, and l) repeating f)-k) for successive further waveforms of the first set of waveforms, thereby generating an accumulated record of all waveforms of the first set of waveforms.

Thus, embodiments of the above method may utilize chunk based waveform accumulation in alternating memory banks to efficiently accumulate waveform data.

BRIEF DESCRIPTION OF THE DRAWINGS

A better understanding of the present invention can be obtained when the following detailed description of the preferred embodiment is considered in conjunction with the following drawings, in which.

Figure 1:
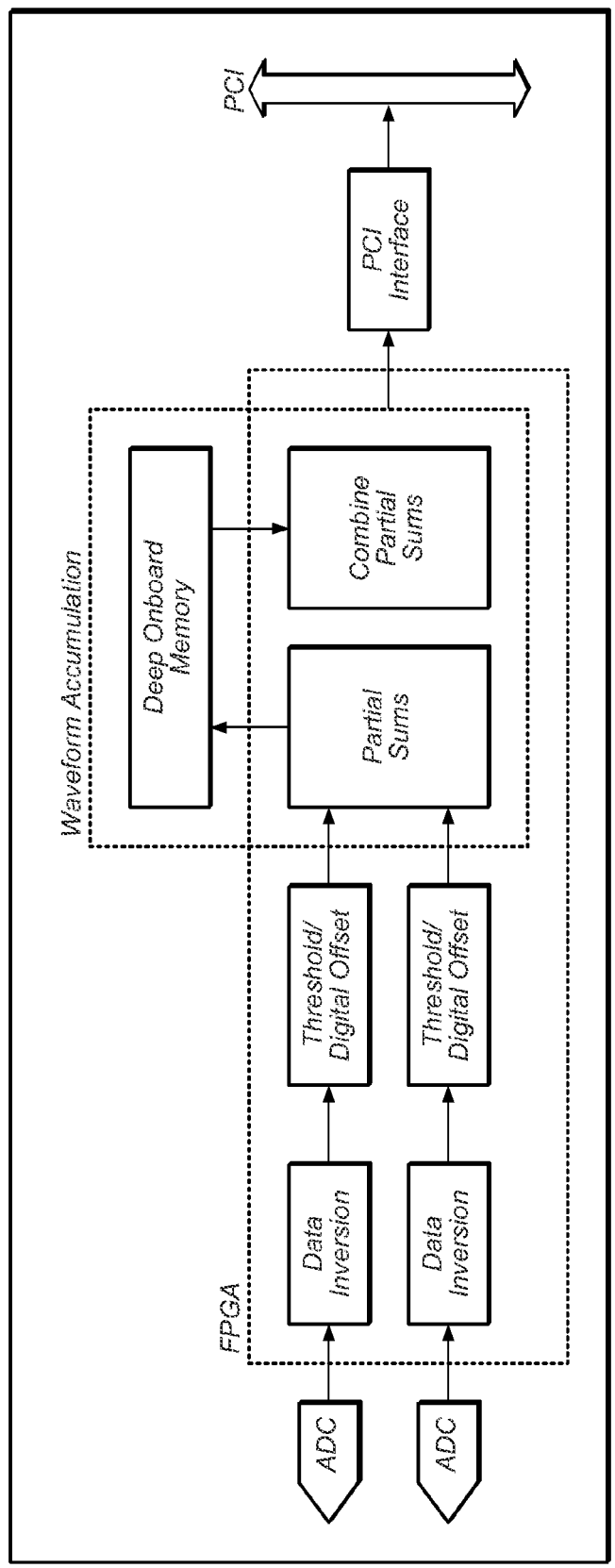
FIG. 1 is a high level block diagram of a digitizer, according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Provisional Application Ser. No. 61/700,818, titled "Hardware Implemented Chunk Based Accumulation of Waveform Data", filed Sep. 13, 2012.

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a PROM, EPROM, EEPROM, flash memory, or magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Circuit—a "circuit" or "circuit device" as used herein has its ordinary and accepted meaning in the art, and at least includes electronic components and connections between the components. Examples of circuits and circuit devices may include printed circuit boards (PCBs), integrated circuits (ICs) including system on chips (SoCs), and/or any of various semiconductor devices, as well as ASICs and programmable hardware elements.

Circuit Diagram—the term "circuit diagram" as used herein has its ordinary and accepted meaning in the art, and at least includes a representation of a circuit including components of the circuit and connections between the components. A circuit diagram may alternatively be referred to as a circuit schematic, an electronic schematic, or an electrical diagram, according to various embodiments.

Trigger—an initiating event that causes the acquisition of a waveform (e.g. a software command, analog signal trigger, digital trigger input, etc.).

Waveform—a set of samples, e.g., acquired in response to a trigger.

Waveform Length—the number of samples in a waveform. The maximum waveform length supported by an accumulating digitizer prevents or complicates acquisition of repetitive events that have a period longer than the maximum waveform length. For some applications, the use of trigger delay can be an acceptable workaround to at least enable inspection of subsections of events of interest for events that last longer than the time period this number of samples would represent.

Waveform Rearm Time—the time from the acquisition of the final sample of one waveform until the digitizer is able to respond to a subsequent trigger and acquire the next waveform to be included in the same accumulated record; this could be due to trigger circuit rearming, re-initialization of internal counters or other acquisition circuits, etc., and is typically on the order of 1 microsecond for giga-samples/second and greater (GS/s+) digitizers.

Accumulator—an addition (summer) operator combined with accumulator memory such that the result of previous sums remains available and any new inputs provided to the accumulator are added to the stored result of previous sums until such time as the Accumulator is re-initialized.

Accumulator Memory—Accumulator memory is the portion of an accumulator that holds the current running sum value while awaiting the presentation of the next value to be added. This memory could be implemented using logic components such as flip-flops, DRAM, etc.

Number of Waveforms Per Bank—denoted herein by "n", this is the number of raw waveforms that may be stored in a given memory bank at a time.

Number of Waveforms Per Accumulated Record—denoted herein by "N", this is the number of waveforms to be accumulated into a single accumulated record.

Accumulated Record—each sample in an accumulated record is the summation of the corresponding samples from each individual waveform in the set of N waveforms to be accumulated. The accumulated record has the same number of samples as each individual waveform that went into the sum; however, the number of bits used to represent each sample in the accumulated record grows with the number of waveforms if the full resolution is to be preserved.

Bank sum (or Partially Accumulated Record)—each sample in a bank sum is the summation of the corresponding samples from each individual waveform in the set of n waveforms that were stored in a single pass through a single memory bank. The bank sum has the same number of samples as each individual waveform that went into the sum; however, the number of bits used to represent each sample in the bank sum grows with the number of waveforms if the full resolution is to be preserved.

Partially Accumulated Chunk—A partially accumulated chunk is a subset of a bank sum. Each sample in a partially accumulated chunk is the summation of the corresponding samples from each individual waveform in the set of n waveforms that were stored in a single pass through a single memory bank.

Averaged Record—an accumulated record divided by the number of individual waveforms N that were summed to create the accumulated record.

It should be noted that some prior art documentation uses the term "dead time" non-specifically, sometimes referring to what is defined herein as waveform rearm time, sometimes to inter-record dead time, sometimes to other time spent readying the device to proceed and sometimes to combinations thereof. Also, some prior art documentation uses the term "record" for what is herein defined as waveform, and the term "multi-record sum" or "block" for what is herein defined as an accumulated record. Thus, these terms should be interpreted carefully in light of the context in which they are presented.

Figure 2:
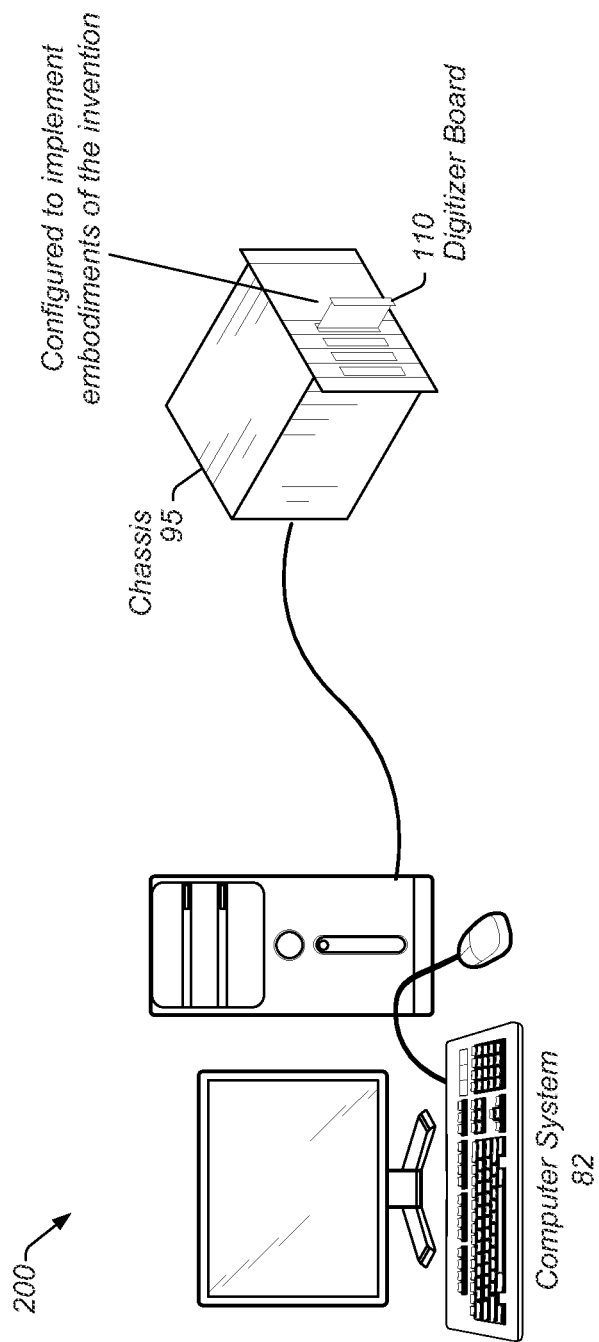
FIG. 2 illustrates an exemplary system configured to implement embodiments of the present disclosure.

FIG. 2—Exemplary System

FIG. 2 illustrates an exemplary system 200 which may be configured to implement embodiments of the present disclosure. As shown in FIG. 2, the system may include a chassis 95 with one or more circuit cards or boards, including a digitizer 110, coupled to a computer system 82 with one or more user input devices, such as a keyboard, mouse, and/or display device. The digitizer 110 may be configured to implement one or more of the techniques disclosed here.

The computer system 82 may include at least one memory medium on which one or more computer programs or software components may be stored. For example, the memory medium may store one or more programs which are executable to control and/or communicate with the chassis, e.g., the digitizer, for example, to receive, store, and possibly analyze data acquired by the digitizer. The memory medium may also store operating system software, as well as other software for operation of the computer system.

Figure 3:
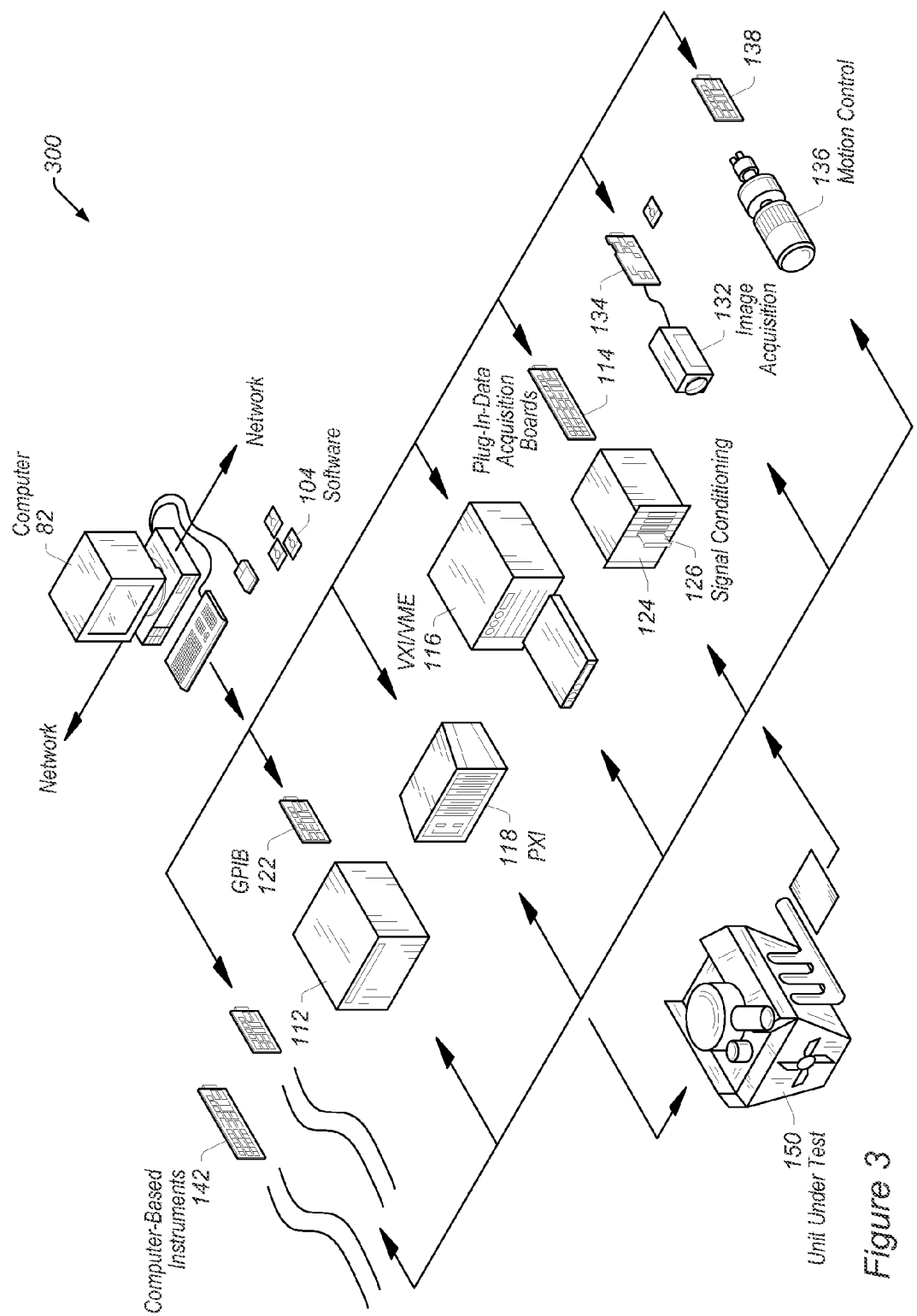
FIG. 3 illustrates an exemplary instrumentation control system, according to one embodiment.

FIG. 3—Instrumentation Control System

FIG. 3 illustrates an exemplary instrumentation control system 300 which may implement embodiments of the present disclosure. According to various embodiments, the instrumentation control system 300 may be involved with performing test and/or measurement functions; controlling and/or modeling instrumentation or industrial automation hardware; modeling and simulation functions, e.g., modeling or simulating a device or product being developed or tested, etc. In particular, embodiments are contemplated in which instrumentation control system is used to perform one or more tests (e.g., using any of the various instruments in the instrumentation control system 300) on a unit under test (UUT) 150, which may include acquiring waveform data from the UUT 150. However, it is noted that embodiments of the present invention can be used for a plethora of applications and is not limited to the above applications. In other words, applications discussed in the present description are exemplary only, and embodiments of the present invention may be used in any of various types of systems.

The system 300 may include a host computer 82 which couples to one or more instruments. The host computer 82 may include a CPU, a display screen, memory, and one or more input devices such as a mouse or keyboard as shown. The computer 82 may operate with the one or more instruments to analyze, measure, or control UUT 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 110, a video device or camera 132 and associated image acquisition (or machine vision) card 134, a motion control device 136 and associated motion control interface card 138, and/or one or more computer based instrument cards 142, among other types of devices. In some systems, one or more instruments may be configurable (or even re-configurable) by a computer system. For example, embodiments are contemplated in which one or more instruments include one or more programmable hardware elements, which may be configured (e.g., using a graphical program created using LabVIEW™ by National Instruments Corporation, or by any other means) to implement a particular function.

The computer system may couple to and operate with one or more of these instruments. The instruments may be coupled to the UUT 150, or may be coupled to receive field signals, typically generated by transducers, and at least one instrument may be or include a digitizer according to embodiments of the present disclosure, which may operate to acquire and digitize signals from the UUT (or field sensors). In some embodiments, one or more of the various devices shown in FIG. 3 may couple to each other over a network, such as the Internet.

The system 300 may be used in a data acquisition and control application, in a test and measurement application, an image processing or machine vision application, a process control application, an automation control application, a man-machine interface application, a simulation application, or a hardware-in-the-loop validation application, among others.

Figure 4A:
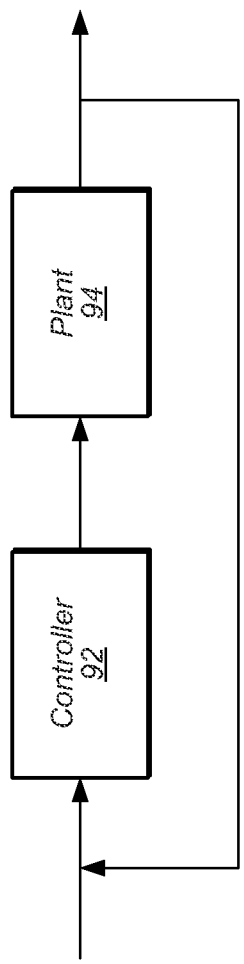
FIG. 4A is a high level block diagram of an exemplary process control system, according to one embodiment.
Figure 4B:
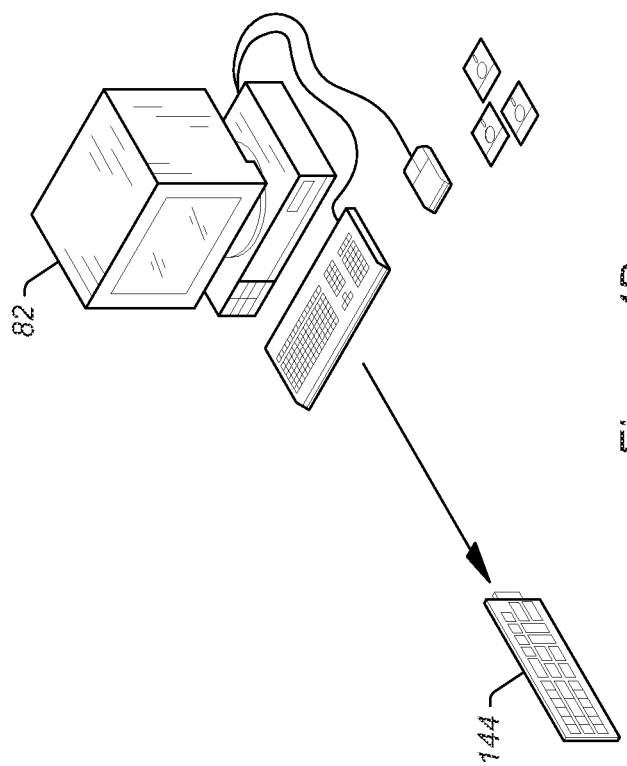
FIG. 4B illustrates an exemplary system which may perform control and/or simulation functions according to some embodiments.

FIGS. 4A and 4B—Further Exemplary Systems

FIGS. 4A and 4B illustrate further exemplary systems configured to implement or utilize embodiments of the techniques disclosed herein.

FIG. 4A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

FIG. 4B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In variations of the above-described embodiments, one or more of the devices may couple to each other over a network, such as the Internet.

Figure 5:
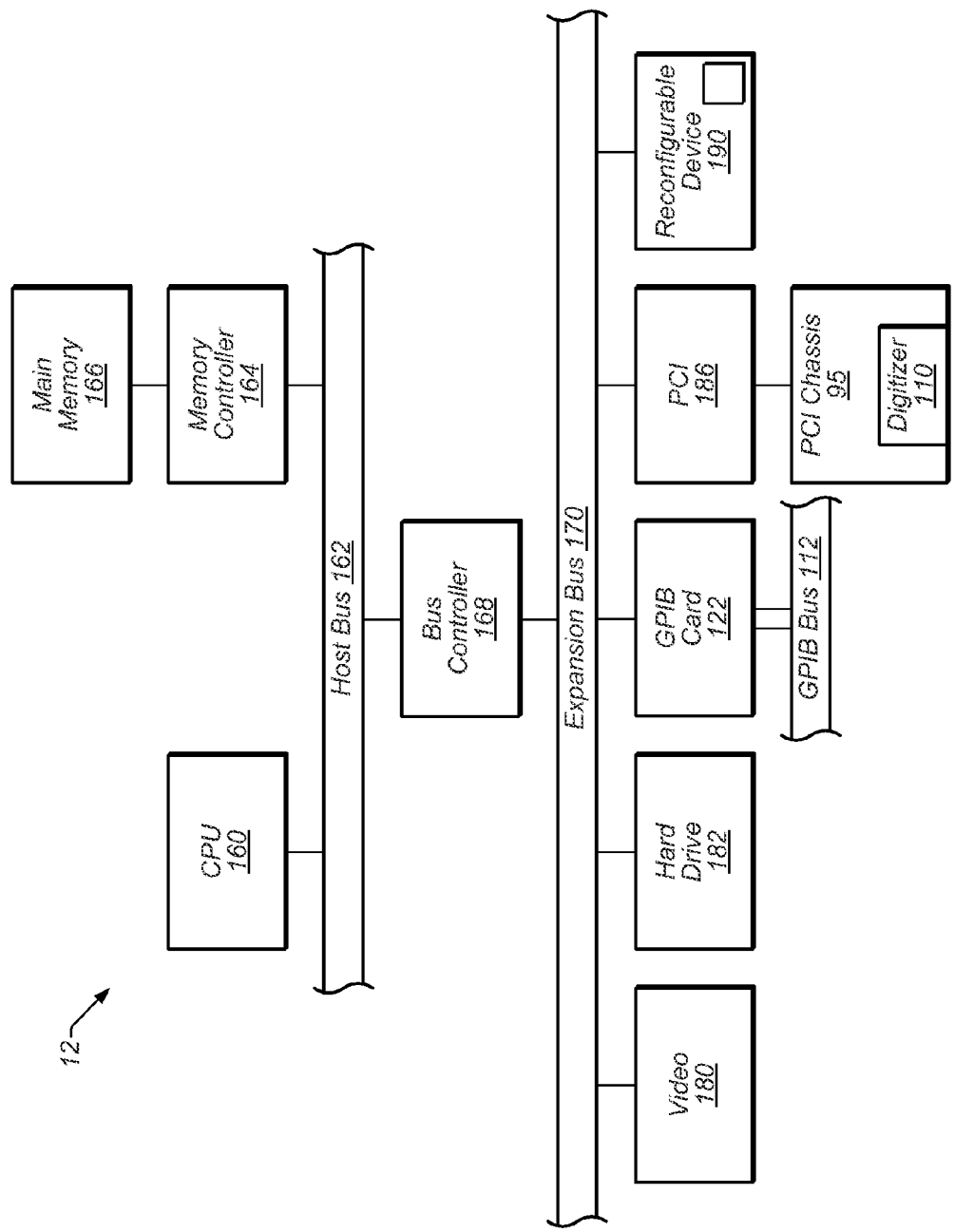
FIG. 5 is an exemplary block diagram of the computer systems of FIGS. 2, 3, 4A, and 4B, according to one embodiment.

FIG. 5—Computer System Block Diagram

FIG. 5 is a block diagram representing one exemplary embodiment of the computer system 82 illustrated in the above-described Figures. It is noted that any type of computer system configuration or architecture can be used as desired, and FIG. 5 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an 96 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the one or more programs executable to implement embodiments of the disclosure. The main memory may also store operating system software, as well as other software for operation of the computer system.

The host bus 162 may be coupled to an expansion or input/output bus 170 by means of a bus controller 168 or bus bridge logic. The expansion bus 170 may be a PCI (Peripheral Component Interconnect) expansion bus, e.g., a PCIe (PCI Express) bus, although other bus types can be used. The expansion bus 170 includes slots by which various devices (such as those described above with respect to the instrumentation control system of FIG. 3) couple to the computer system 82. The computer 82 further comprises a video display subsystem 180 and hard drive 182 coupled to the expansion bus 170. The computer 82 may also comprise a GPIB card 122 coupled to a GPIB bus 112, and/or an PCI (or PCIe) card or device 186 coupled to a PCI (or PCIe) chassis 95, e.g., that includes an embodiment of digitizer 110.

It should be noted that while embodiments of the digitizer (and/or chassis) are described herein with respect to a PCIe implementation, any other protocols, chassis, or buses may be used as desired. Moreover, in various embodiments, the digitizer disclosed herein may be implemented as an expansion card for a host computer, a board for use in a chassis (e.g., per FIG. 2), a standalone device, etc., as desired. Additionally, in some embodiments, the host computer 82 may be implemented as or on a card in the chassis 95.

Waveform Accumulation

Accumulation operations have commonly been implemented in host software. In the host software-based accumulation paradigm, applications that require continuous production of accumulated records must be able to transfer those raw waveform data from the digitizer to the CPU/host memory, generally across a computer bus with limited bandwidth, on an on-going basis. As digitization technology has advanced to the point that it can produce data that overwhelms the buses available for returning digitized data to the host, a host software-based approach forces the user to choose between access to the latest digitization technology which puts a heavier load on the bus and key accumulation specifications. The bus bottleneck causes long inter-record dead time as a result of the longer time spent waiting for waveforms to be transferred across the bus. The latest digitization technology used with this model effectively makes the inter-record dead time so long that the percentage of time spent waiting dwarfs the time spent sampling.

Inter-record dead time has highly undesirable implications for end-applications, especially applications requiring high sensitivity measurements of low amplitude signals and applications measuring/searching for intermittent events. For these sensitive measurements, every low amplitude event missed means that the underlying phenomenon that it represents is more susceptible to being lost among the noise.

Some applications do not require continuous accumulation. Those requiring a waveform length and a number of waveforms per accumulated record that could fit in the digitizer's on-board memory and queued for later transfer across the bus could still be addressed within the host software-based accumulation paradigm while using higher sampling rate and higher resolution digitizers, but for modern digitizer and typical PC (personal computer) bus technologies the inter-record dead time in a host software-based approach would be dominated by the time delay that results from the mismatch between the number of bytes needing to be pushed through the bus and the bus's available throughput. For a host-software implementation, during the readout time, the acquired waveforms acquisition of new data for subsequent accumulated records cannot begin because the on-board memory remains in use until its contents are transferred to the host.

Some prior art approaches sought to address this issue by bringing the accumulation operation into the digitizer hardware itself. For cases where there is memory much larger than the desired waveform size available on-board and the memory is sufficiently fast that it can be read and rewritten faster than the arrival rate of incoming ADC samples, the accumulation can be done directly in memory. Then the accumulation process can be stopped and the finished data read out. This technique would still incur inter-record dead time during the memory readout and bus transfer time as well as any time necessary to rearm triggering circuitry, but transferring only one accumulated record rather than all the individual raw waveforms that required transferring under the host software-based implementation can, for many configurations, significantly reduce bus transfer time. However, this approach requires significant memory bandwidth, which does not scale gracefully with increased data acquisition rates.

Accordingly, depending on the application and associated constraints, one or more techniques disclosed herein may be used to address or ameliorate one or more of the shortcomings of prior art approaches. For example, one technique may minimize inter-record dead time, another technique may improve waveform length, another may allow one to keep the original waveform for certain applications, e.g., debugging, and so forth.

Below are presented multiple approaches for addressing various limitations of prior art in the area of hardware-based accumulation, enabling optimization of the design for various performance factors. Note that as used herein, the term "hardware implemented" means that the functionality is implemented via one or more ASICs (application specific integrated circuits) or via one or more programmable hardware elements, e.g., FPGAs.

Method 1: Hardware Implemented Chunk Based Double Buffered Waveform Accumulation FIGS. 6 and 7A-7I illustrate an exemplary embodiment of hardware implemented chunk based double buffered waveform data accumulation, and FIGS. 8A and 8B illustrate further details of this chunk based accumulation method. More specifically, the approach illustrated in FIGS. 6 and 7A-7I, which may be referred to herein as "method 1", implements hardware based waveform accumulation using double buffering, e.g., via alternating storage to, and accumulation from, (at least) two memory banks, e.g., bank A and bank B (or functional equivalents). Thus, a digitizer configured to implement embodiments of the techniques of FIGS. 6 and 7A-7I may include two memory banks via which the double buffering is performed, and when operated, may acquire and process multiple waveforms, including accumulating N of the waveforms. In this technique, each memory bank may be capable of storing n of the waveforms at a time, and a series of such (n waveform) sets or sequences may be accumulated by the digitizer. Thus, in direct contrast with some prior art techniques, "deep memory" (meaning extensive, less readily accessible data storage) is not used for accumulation memory, but rather for holding raw waveforms. With a chunk based approach, the actual accumulator memory can be much smaller than that required to store an entire accumulated record. As a result, in one embodiment, the accumulation memory may be allocated in the controller. In different embodiments, the memory in the final accumulator for summing the bank sums (running sum accumulated record in FIGS. 7E-7I) could, for example, be implemented in the controller, in one or both of the memory banks, or in a different device in the system, e.g., instrumentation control system 300, including host computer memory.

Figure 6:
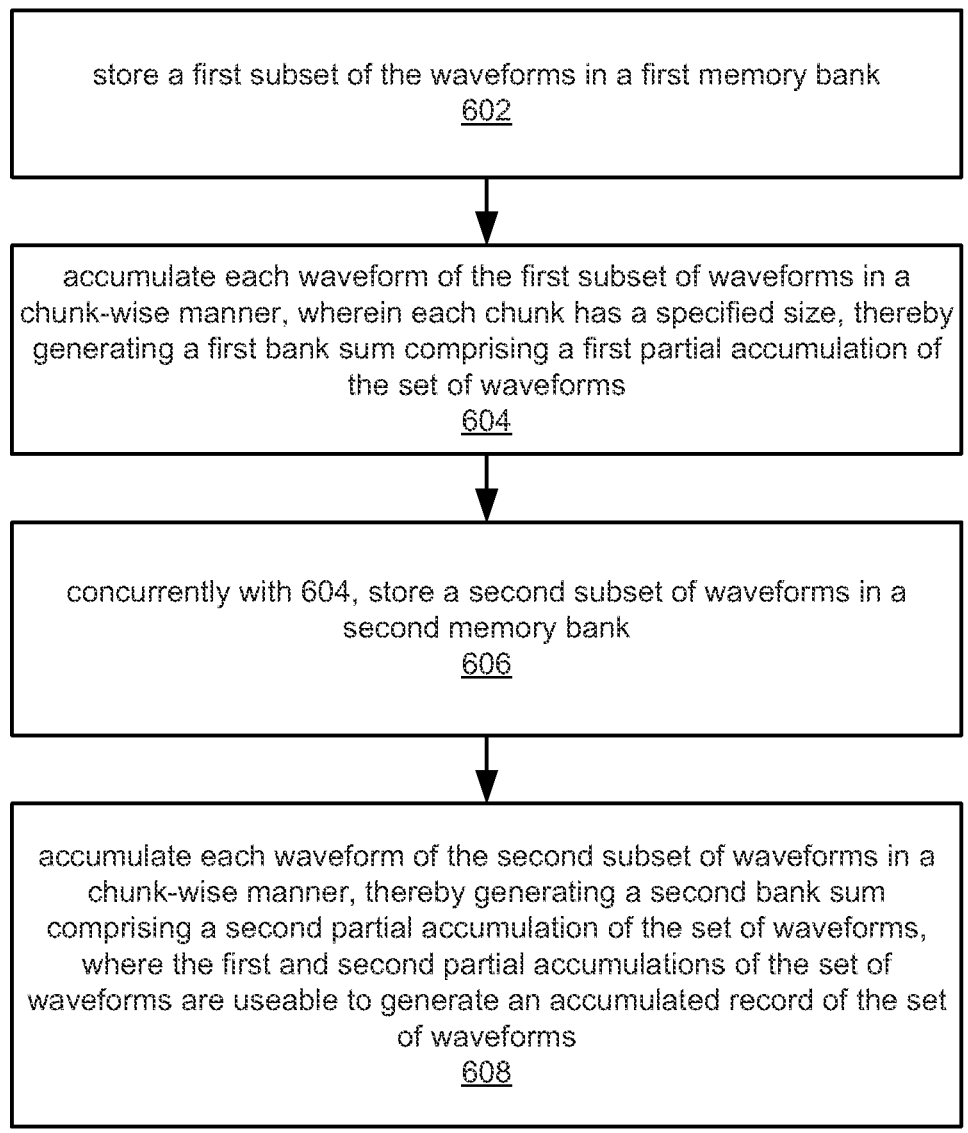
FIG. 6 is a flowchart diagram illustrating one embodiment of a method for accumulation of waveform data using alternating memory banks.

FIG. 6: Flowchart of a Method for Accumulation of Waveform Data with Using Alternating Memory Banks FIG. 6 illustrates a method for accumulation of waveform data using alternating memory banks, e.g., via double buffering, according to one embodiment. The method shown in FIG. 6 may be used in conjunction with any of the computer systems or devices shown in the above Figures, e.g., variants of the digitizer of FIG. 13, described below, among other devices. In various embodiments, some of the method elements shown may be performed concurrently, in a different order than shown, or may be omitted. Additional method elements may also be performed as desired. As shown, this method may operate as follows.

First, in 602, a first subset of waveforms (to be accumulated) may be stored in (written to) a first memory bank, e.g., memory bank A of a digitizer that further includes a second memory bank. Note that in other embodiments, additional memory banks may be used as desired.

In 604, each waveform of the first subset of waveforms may be accumulated in a chunk-wise manner, thereby generating a first bank sum comprising a first partial accumulation of the set of waveforms. Each chunk may have a specified size. As will be described in more detail below, after the first bank sum is computed, it may be added to and stored in a running sum accumulated record, which may be initialized to a known value before the first subset of waveforms is acquired.

In 606, a second subset of waveforms may be stored in (i.e., written to) the second memory bank, e.g., memory bank B, concurrently with the accumulating of 604.

In 608, each waveform of the second subset of waveforms may be accumulated in a chunk-wise manner, thereby generating a second bank sum comprising a second partial accumulation of the set of waveforms. The first and second partial accumulations of the set of waveforms may be useable to generate an accumulated record of the set of waveforms, as described below.

Note that because raw waveforms are stored to memory bank A until the receiving bank switches to memory bank B, all the data from those waveforms may be available for accessing in any order, unlike when it arrived in order from the ADC. Chunk based approaches take advantage of this fact to allow the use of smaller accumulator memory, which offers significant advantages.

Elaborating on one embodiment of the above, the sets (or sequences) of n waveforms may be stored to two memory banks in a grouped alternating fashion (completely controlled by the hardware with no software intervention) until the number of waveforms specified per accumulated record, N, have been stored. Note that N may or may not be an even multiple of n, and so in some cases one or both of the memory banks may not be entirely filled. In the event that N is not an even multiple of n, care should be taken not to include any invalid contents of non-filled memory locations in the summing (accumulation). For each set (or sequence) of waveforms stored in a bank (e.g., banks A and B), the contents of the bank may be used to produce a bank sum from the sample-wise sum of each of the waveforms stored in the associated memory bank. Regarding terminology, as noted above, an accumulated record is the summation of the corresponding samples from each individual waveform in the set of N waveforms to be accumulated. Similarly, a bank sum may be used to accumulate a running sum of waveform data from a particular memory bank. In other words, the method of FIG. 6 may also accumulate the first and second bank sums into a running accumulation of the set of waveforms, and moreover, may repeat the above method elements 602-608 and the further accumulation of the accumulated bank sums, may be performed repeatedly for successive additional (first and second) subsets of the set of waveforms to generate an accumulated record of the set of waveforms.

Accordingly, when multiple accumulations (of sets of N waveforms) are performed to produce multiple accumulated records, some type of indexing may be used to denote which accumulated record and which set of n waveforms in that accumulation are being considered, e.g., bank sum (0,1), denoting it is contributing to the first accumulated record (accumulation 0, with zero based counting) and is the partial accumulation from a bank of data holding the second set of n waveforms for that accumulated record (n set 1, with zero based counting).

Thus, in some embodiments, the accumulated waveform data in the memory banks (e.g., banks A and B) may themselves be accumulated. More specifically, the method may further include accumulating the first and second bank sums into a running accumulation of the set of waveforms, e.g., via the digitizer, i.e., a circuit comprised in the digitizer. Moreover, as also indicated above, the above method elements may be repeated one or more times in an iterative manner, thereby accumulating successive further first and second subsets of the set of waveforms, thereby generating an accumulated record of the set of waveforms. In other words, the above method elements 602-608 and the further accumulation of the accumulated bank sums, may be performed repeatedly for successive additional (first and second) subsets of the set of waveforms to generate an accumulated record of the set of waveforms. In other embodiments, this second level of accumulation may be performed by a host computer coupled to the digitizer. For example, the method (e.g., via a circuit of the digitizer) may include transferring the bank sums to a host computer using a host computer bus, e.g., via DMA (Direct Memory Access), and store the bank sums in host computer memory. The host computer may be configured to accumulate the first and second bank sums into a running accumulation of the set of waveforms. Additionally, the host computer may be configured to operate in conjunction with the (circuit of the) digitizer to repeat the above method elements, including the accumulation of the bank sums on the host side for successive further first and second subsets of the set of waveforms, thereby generating an accumulated record of the set of waveforms.

Moreover, in further embodiments, multiple such accumulated records of respective sets of waveforms may be accumulated (with or without participation by the host computer). Thus, in one exemplary embodiment, if the desired N is 4*n, meaning that 4*n waveforms are summed (accumulated) on a per sample basis, and if the desired number of accumulated records is 2, meaning that two such sets of N waveforms are to be accumulated, then the following basic operations may be performed:

Waveforms [0, n−1] (the first n waveforms, i.e., n set 0) may be written to Bank A while Bank B is idle;

Waveforms [n, 2*n−1] (the second n waveforms, i.e., n set 1) may be written to Bank B while waveforms [0, n−1] are concurrently read from Bank A and accumulated into a bank sum for the first set of waveforms, denoted as bank sum (0,0);

The bank sum (0,0) may then be provided as an input to a secondary accumulator for applications requiring N>n, thereby clearing the bank sum buffer for use in the preparation of the next bank sum required to produce the accumulated record;

Waveforms [2*n, 3*n−1] (the third n waveforms) may be written to Bank A while waveforms [n, 2*n−1] (the second n waveforms) are concurrently read from Bank B and accumulated into a bank sum for the second set of waveforms, denoted as bank sum (0,1) and provided as an input to a secondary accumulator;

Waveforms [3*n, 4*n−1] (the fourth n waveforms) may be written to Bank B while waveforms [2*n, 3*n−1] (the third n waveforms) are concurrently read from Bank A and accumulated into bank sum (0,2) and provided as an input to a secondary accumulator;

Waveforms [4*n, 5*n−1] (the fifth n waveforms, i.e., n set 4, or the first n waveforms of the second accumulation, i.e., n set(0,1)) may be written to Bank A while waveforms [3*n, 4*n−1] (i.e., n set 3) are concurrently read from Bank B and accumulated into bank sum (0,3) and provided as an input to a secondary accumulator If so configured, the 4 bank sums for this first accumulated record (of the first set of N waveforms) which were provided as inputs to the secondary accumulator have now been further accumulated into a first accumulated record (0) (again, using zero based counting). This final accumulation (of the first N waveforms) may be performed in any of a variety of ways, as desired. In one embodiment, the secondary accumulation is computed in hardware. In another embodiment, when convenient for the application and design constraints, the bank sums which generally require a significant reduction in bytes vs. the original raw waveforms can be successfully transferred across the bus to the host computer for a final accumulation operation with no impact on key application specifications. In this embodiment, the "heavy lifting" portion of the accumulation is accomplished in the hardware while the final sum is completed by the CPU. The handling of the resulting accumulated records may be performed in any of a variety of ways, as desired. For example, in one embodiment, once an accumulation (of N waveforms) has been performed, the result may be moved to another storage location to free up the accumulated record/buffer for use in the preparation of the next accumulated record. In another embodiment, memory for multiple accumulated records may be provided in either a linear or circular buffer fashion, and each accumulation stored in a respective record.

Waveforms [5*n, 6*n−1] (the sixth n waveforms, i.e., n set 5, or the second n waveforms of the second accumulation, i.e., n set(1,1)) may be written to Bank B while waveforms [4*n, 5*n−1] are concurrently read from Bank A and accumulated into bank sum (1,0), and provided as an input to a secondary accumulator; since this bank sum is the first bank sum of the second accumulated record, the secondary accumulator may be cleared to a known initial value before the bank sum is provided as an input to the secondary accumulator;

Waveforms [6*n, 7*n−1] (the seventh n waveforms, i.e., n set 6, or the third n waveforms of the second accumulation, i.e., n set(1,2)) may be written to Bank A while waveforms [5*n, 6*n−1] are concurrently read from Bank B and accumulated into bank sum (1,1) and provided as an input to the secondary accumulator;

Waveforms [7*n, 8*n−1] (the eighth n waveforms, i.e., n set 7, or the third n waveforms of the second accumulation, i.e., n set(1,3)) may be written to Bank B while waveforms [6*n, 7*n−1] are concurrently read from Bank A and accumulated into bank sum (1,2) and provided as an input to the secondary accumulator; and Waveforms [7*n, 8*n−1] are read from Bank B and accumulated into bank sum (1,3) and provided as an input to the secondary accumulator.

The bank sums for this second accumulation (of the second set of N waveforms) may be further accumulated into a second accumulated record (1) (again, using zero based counting). As with the first accumulation, this (second) final accumulation (of the second N waveforms) may be performed in any of a variety of ways, as desired, e.g., re-using the original accumulated record buffer, or using a second accumulated record, buffer etc. Similarly, the final accumulated records for each set of N waveforms may be stored locally (on board the digitizer) and/or transmitted to external storage, e.g., of a host controller or other external device.

Note that this switching back and forth between banks can proceed for however many accumulated records are configured, including indefinitely.

FIGS. 7A-7I illustrate an exemplary embodiment of the above method (method 1/FIG. 6).

Figure 7A:
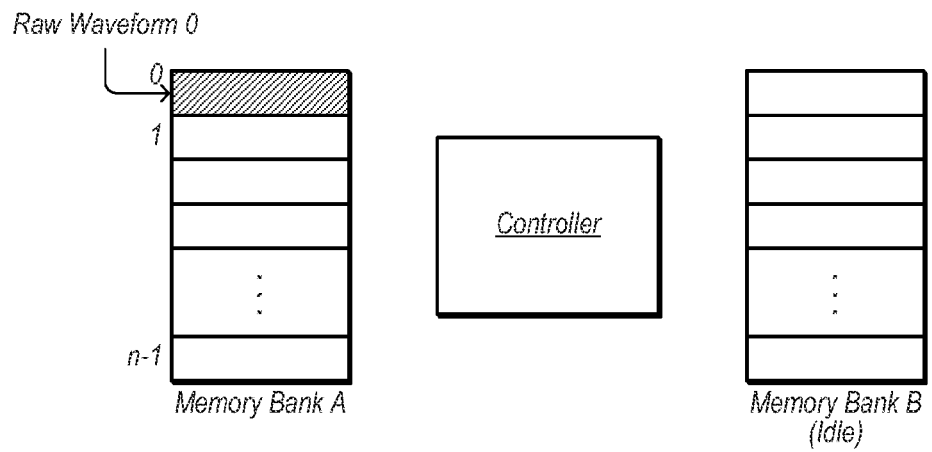
FIGS. 7A-7I illustrate exemplary waveform data accumulation per the method of FIG. 6, according to one embodiment.
Figure 8A:
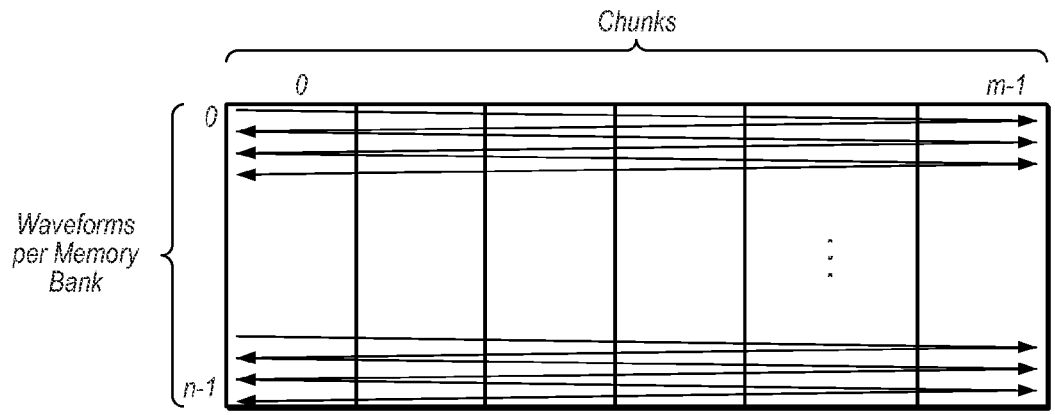
FIGS. 8A-8B illustrate exemplary onboard memory write (8A) and read orders (8B) for the exemplary waveform data accumulation of FIGS. 7A-7I, according to one embodiment.
Figure 8B:
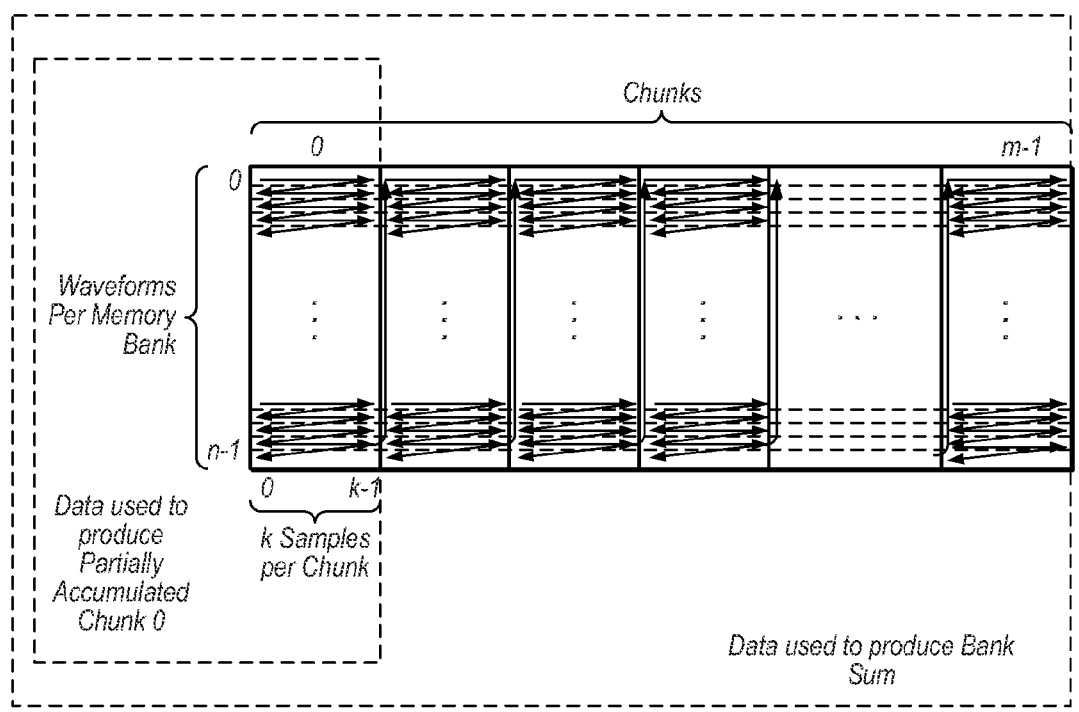

FIG. 7A illustrates storing an initial (first) acquired raw waveform of a first set (or sequence) of n waveforms, specifically, waveform 0 (using zero-based counting), in memory bank A of the digitizer, while bank B is idle. It should be noted that the particular appearance or apparent structure of the memory banks is meant to be exemplary and illustrative only, and is not intended to limit the types or structures of the memory banks to any particular form, structure, or appearance. In various embodiments, any double buffering architecture may be used as desired. Moreover, in some embodiments, the memory banks may not be limited in size to only store n waveforms. For example, one or both of the memory banks may include enough space to further store other data, e.g., partial or entire accumulated waveform data including what is described herein as bank sums or accumulated records.

Figure 7B:
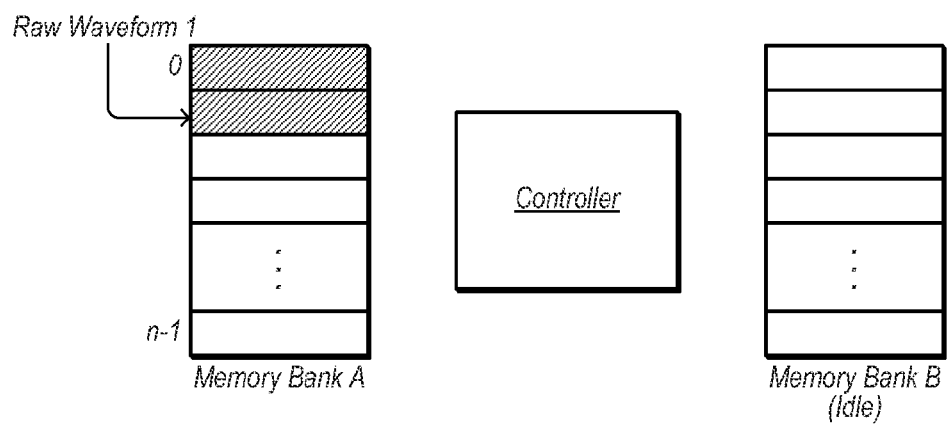
Figure 7C:
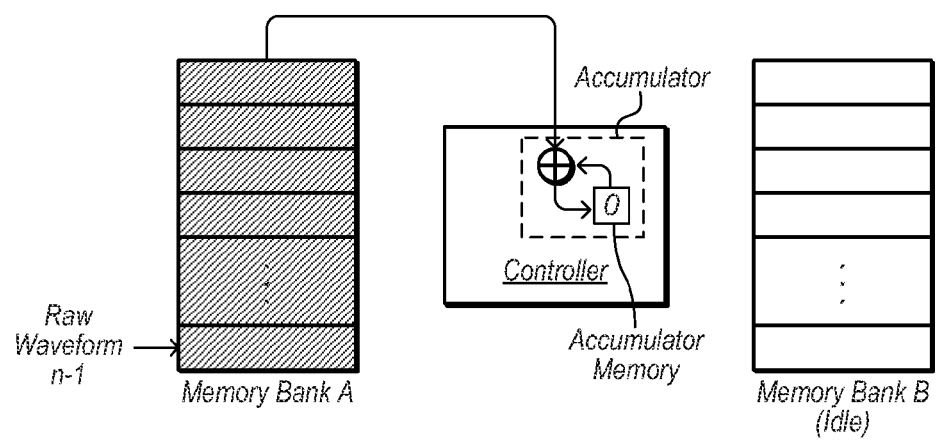

FIG. 7B illustrates storing a second raw waveform, waveform 1, in bank A. FIG. 7C illustrates storing a final waveform of the (first) set (or sequence) of n waveforms, specifically, raw waveform n−1 (the $n^{th}$ waveform of the set), in bank A, and the start of an accumulation of the previously stored samples, as indicated by the summer symbol (circle with plus sign) and the "zero" indicating the clearing of the accumulation memory in preparation for beginning accumulation operations on the sequence in Bank A.

Figure 7D:
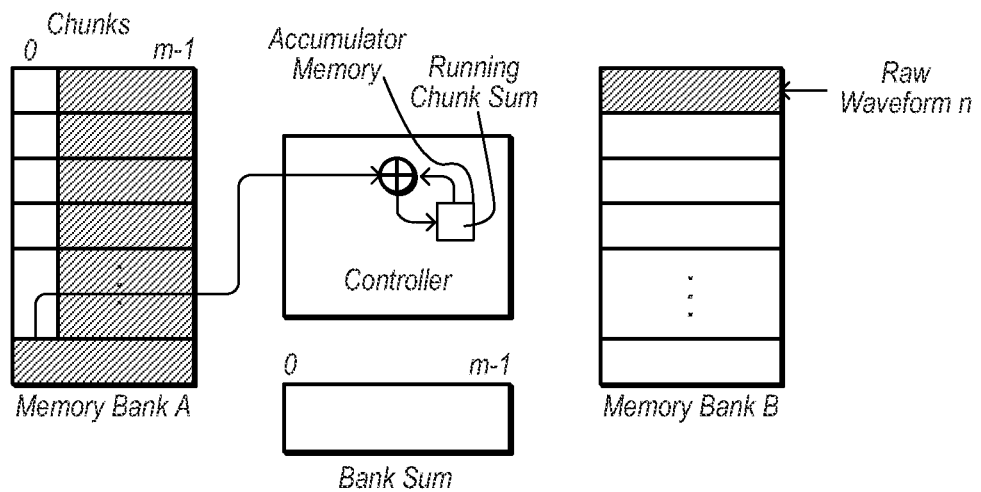

FIG. 7C illustrates switching of incoming write data (next set or sequence of n waveforms) to memory bank B, and a running "chunk" summation of the stored data in memory bank A, which will be stored in a "bank sum", shown in FIG. 7D, which may be part of or distinct from memory bank A, as desired. As used herein, the term "chunk" refers to a specified (static or dynamic) amount of data (e.g., of size k samples), according to which the accumulation of waveform data is performed. Note that since no previous waveform data were accumulated for the set of data currently in bank A, the first instance of each sample in each chunk to enter the accumulator is summed with "zero" due to initialization, as indicated. Note that in various embodiments, the "zero" value can actually be 0, or any other known value convenient for the application. In other embodiments, the "zero" value may be different for each element of the bank sum. The accumulator may be re-initialized to this zero value at the start of each "chunk" summation such that the resulting partially accumulated chunk contains data only from samples corresponding to the samples within the current chunk range for the waveforms currently in the bank as depicted in FIG. 8B (described below).

More specifically, bank A begins read operations, where successive chunks of the stored waveforms are read and summed (accumulated), and the result stored at the location corresponding to the chunk in the bank sum. For example, assuming that each chunk includes corresponding sets of k samples from each of the n waveforms in bank A, and that there are m chunks in bank A, the bank sum may be configured to store the accumulated m chunks, as indicated in FIG. 7D. Said another way, once the waveform data (for a set or sequence of n waveforms) have been stored in a memory bank (i.e., buffer), the data in that bank may be read and accumulated, chunk-wise, and the resulting "chunk sums" or partially accumulated chunks maintained in the bank sum. In a simple embodiment, n may be equal to 1 (i.e., only one waveform may be stored in a bank at a time), and the chunk size k may be 1 sample (and so, in this simple case, the number of chunks m is simply the number of samples in the waveform, in which case the accumulator or summer may read (and accumulate/sum) 1 sample at a time (while the next waveform is written to the other memory bank). However, in typical embodiments, m may be greater than 1. In these figures, dark fills in the memory banks indicate written data, and partial fills indicate that some data have been read from the bank. Thus, once all of the data in a bank has been read, the bank may be shown as empty, which simply means that new data can be written to that bank, possibly after clearing the previous (read) data.

As FIG. 7D also indicates, an exemplary accumulation process regarding bank A may include reading m chunks (e.g., chunk 0 through chunk m−1), where each chunk includes a respective k samples from each of the n waveforms stored in the bank (A). Note that FIG. 7D shows that the accumulation (reading/summing) has read (and accumulated) all but the last portion of chunk 0 (of the m chunks), i.e., all but the contribution (for chunk 0) from waveform n−1 (the $n^{th}$ waveform in bank A), as indicated by the partial fills in the bank. Note further that while this accumulation of bank A proceeds, the next waveform (waveform n, the $(n+1)^{th}$ waveform, is written to bank B, as also indicated in FIG. 7D. Subsequent waveforms may then be written to bank B while the accumulation of bank A proceeds.

Note that in some embodiments, between memory bank switches (from read to write or write to read), read and write operations may operate asynchronously. The relative progression through the read and write operations shown is exemplary only (e.g., arbitrary), and such read and write operations may be performed in any order desired, so long as the read operations free the required storage (locations) before it is required for subsequent writes.

In other words, in some embodiments, with this chunk-based approach samples may be read out in a different order from that in which they were written. This allows for waveform lengths that exceed the available accumulator memory which is sized simply based on the number of samples, k, per chunk. This approach also allows for optimization of the memory access size to address access time artifacts of the memory architecture vs. the amount of memory used in the accumulator. Further, it allows transfer of each chunk of the bank sum running sum to the secondary accumulator or host as it is completed rather than waiting until the entire accumulated record is calculated as is the case in the prior art.

Figure 7E:
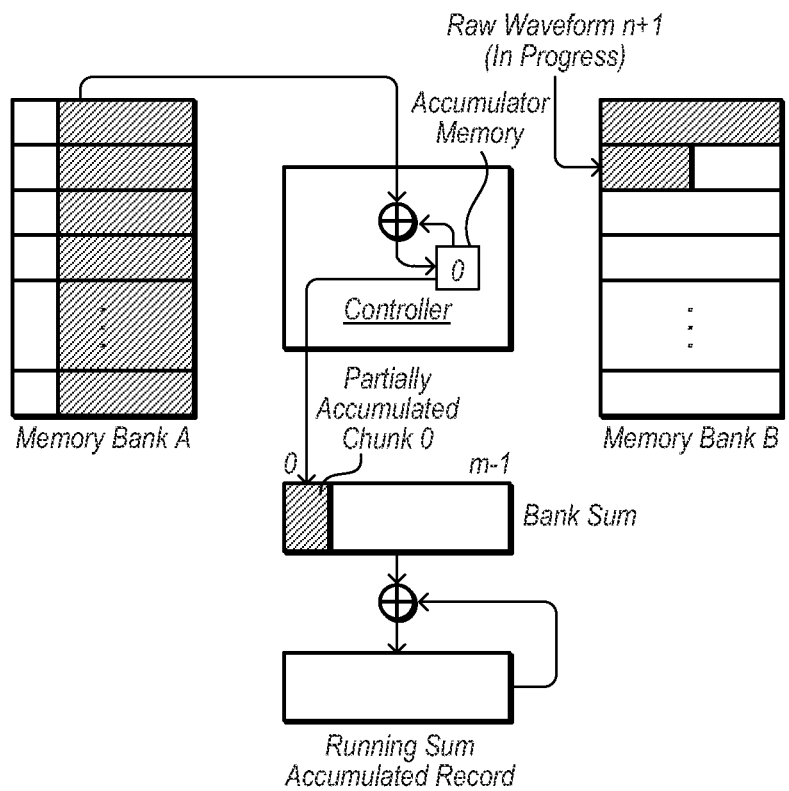

FIG. 7E illustrates completion of the accumulation of chunk 0 of the waveforms stored in memory bank A. As shown, all of the chunk 0 samples have been read from memory bank A and summed (accumulated) on a per sample basis, with the resulting partially accumulated chunk 0 stored in the bank sum of FIG. 7D. Note that in the exemplary embodiment shown, the bank sum is coupled to an accumulated record, which may be configured to accumulate and store the partially accumulated chunks in the bank sum, e.g., via another summing or accumulating process or component, represented in FIG. 7E by second summer symbol. Note that the accumulation/summing of the data in memory bank may be performed concurrently with the writing (storing) of further waveforms in memory bank B, beginning specifically with raw waveform n+1, as shown. In other words, while the chunks of waveforms 0 through n−1 continue to be accumulated from memory bank A, waveform n+1 data are being written to memory bank B, as indicated by the partial fill of the second waveform (waveform n+1) portion of memory bank B. There is no additional Waveform rearm time between waveforms that will be stored in separate banks vs. in the same bank.

Thus, a subset (e.g., finite cross section) of each of the waveforms accumulated in memory bank A may be logically grouped into (or considered as) a chunk of some number of samples, e.g., k (chunk size). These samples may be read from each waveform in the memory bank and accumulated into a k-sample (partially) accumulated chunk. In other words, to create a partially accumulated k-sample chunk, respective k-sample chunks may be read from each waveform in the bank, and summed or accumulated, resulting in the partially accumulated k-sample chunk, where each partially accumulated (k-sample) chunk may be further accumulated from successive waveforms written to the bank(s). For simplicity, the k-sample accumulation operations are depicted or represented in FIG. 7E (and others) by a single symbol (circle with plus sign). Once this is complete as depicted in FIG. 7G, the accumulator memory is reinitialized as previously mentioned.

Figure 7F:
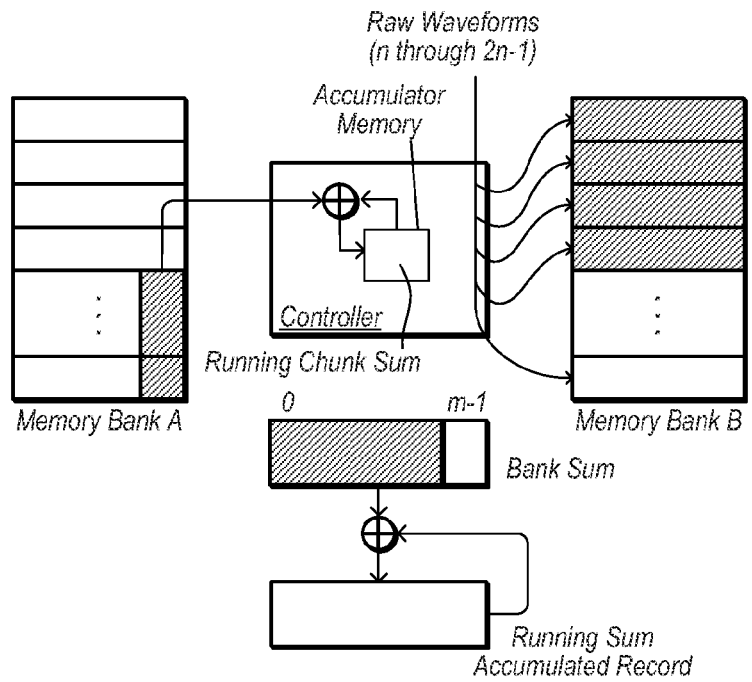

FIG. 7F illustrates writing the next set of waveforms (specifically, waveforms n through 2n−1) into memory bank B, while accumulating the previously stored waveforms of memory bank A (indicated by the partial fill of bank A, and the "running chunk sum" notation adjacent to the summer symbol) into the bank sum (shown almost full).

Note that this method may be implemented either with a fixed number waveforms (e.g., n) per bank or a programmable number of waveforms per bank, as desired.

Figure 7G:
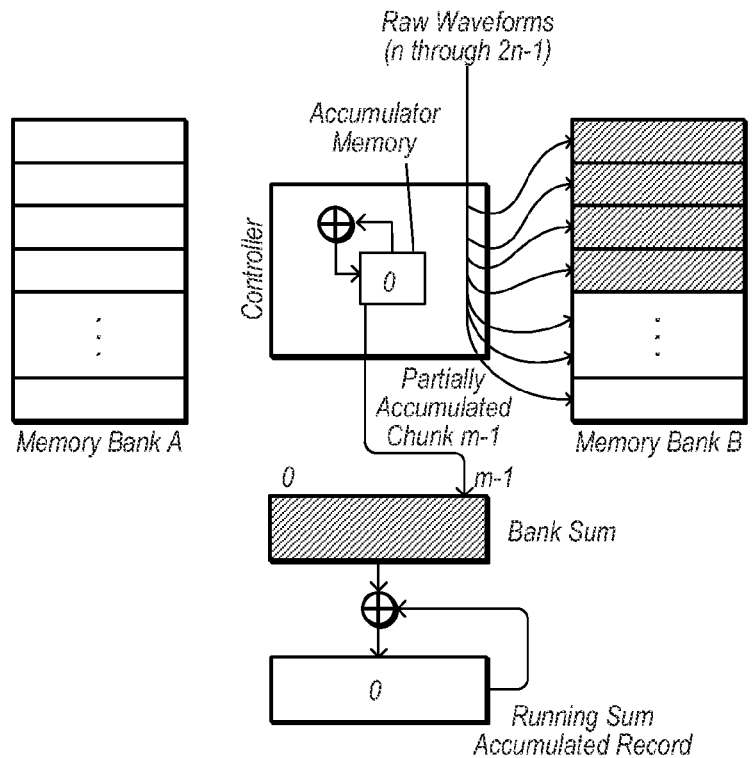

FIG. 7G illustrates completion of the accumulation of the waveform data in bank A into the bank sum (specifically, accumulation of partially accumulated chunk m−1, as shown) as raw waveforms n through 2n−1 are written to bank B and the accumulator that produced the partially accumulated chunk is reinitialized.

Figure 7H:
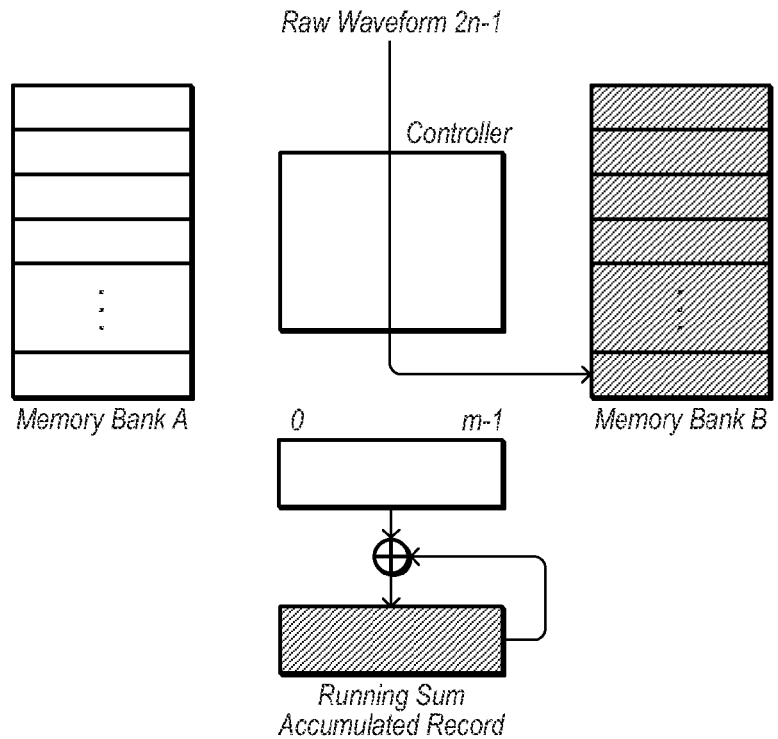

FIG. 7H illustrates completion of the writing of raw waveform 2n−1 to bank B, as well as initiation of the "running sum" accumulation of data in the bank sum into the (final) accumulated record, where the bank sum is shown full, and the (final) accumulated record is shown empty.

Figure 7I:
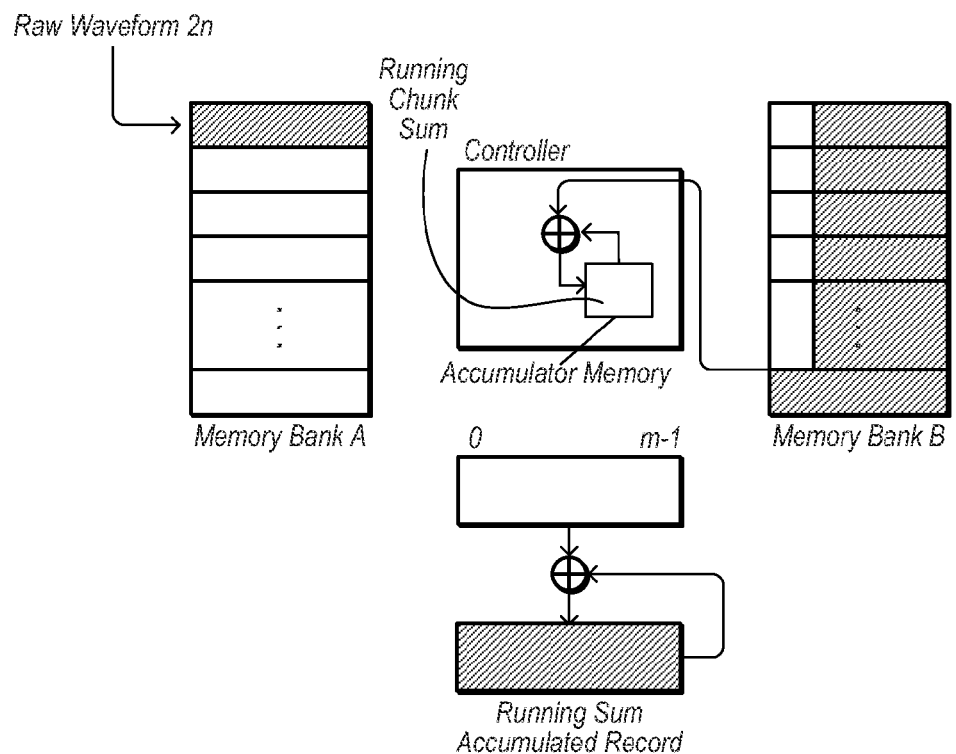

FIG. 7I illustrates writing of raw waveform 2n to bank A, while concurrently reading and accumulating a first partially accumulated chunk from bank B. As FIG. 7I also shows, the bank sum of FIG. 7H has been accumulated (summed) into the (final) accumulated record, after which the process illustrated by FIGS. 7A-7I may begin again, continually adding to the running sum or (final) accumulated record until the desired number of waveforms (e.g., N) has been processed (accumulated).

Note that once N is satisfied, e.g., by however many memory bank switches are necessary, the circuit (e.g., ASIC or programmable hardware element) may continue to switch banks without software involvement and may immediately begin generating or populating the next accumulated record (e.g., subject only to the same waveform rearm time as all other new waveforms). This process may continue either for a specified or programmed number of accumulated records to acquire, or indefinitely, as configured.

FIGS. 8A and 8B present further details regarding the above described chunk based accumulation method, according to one embodiment.

FIG. 8A illustrates possible writing order to a memory bank, according to one embodiment, with an initial write beginning at the top left side of the figure (at the first chunk of the first waveform, i.e., waveform 0, with zero based counting), and proceeding as indicated by the successive arrows through chunk m−1 of waveform n−1. More specifically, the illustrated write order proceeds horizontally, writing successive chunks of waveform 0 into the memory bank, then successive chunks of the second waveform, i.e., waveform 1, and so forth, until all the successive chunks of the $n^{th}$ waveform (waveform n−1) are written to the bank.

Now, FIG. 8B illustrates a possible reading order from a memory bank (for accumulation), such as the memory bank of FIG. 8A, according to one exemplary embodiment. As shown, in this example, reads start at chunk 0 of waveform 0 (first chunk of the first waveform), reading its respective k samples to produce partially accumulated chunk 0, proceeds to chunk 0 of waveform 1, and so forth, through chunk 0 of waveform n−1, thereby accumulating a partially accumulated chunk 0 from the n waveforms. Then, as shown indicated by the arrows, the read continues with chunk 1 of waveform 0 through chunk 1 of waveform n−1, and so forth, until all chunks of all the waveforms are read (and accumulated), producing one partial accumulated record.

This chunk based approach may enable efficient hardware based accumulation without the historical record length limitations imposed by the size of the memory in the accumulator (on the digitizer) itself. The approach may enable the reuse of the accumulator memory (e.g., partial (and/or total) accumulated records or buffers) while still processing data at the rate of acquisition and accommodating access times and organizational characteristics of the deep memory (on the digitizer). The record length limit may then become a function of the size of the deep memory, which is easily upgraded as that technology advances. Chunk size and specific write and read orders can be optimized for the access times and organizational characteristics of the selected memory type used.

As depicted in FIGS. 8A and 8B, with the described chunk-based approach samples may be read out in a different order as that in which they were written. This allows allocating accumulator memory inside the ASIC or programmable hardware element (e.g., FPGA) while still supporting waveform lengths that exceed the size of the accumulator memory. By processing a particular range of samples from each waveform in the bank together, a partially accumulated chunk made up of the sample sums can be calculated. This intermediate result is generally highly compressed vs. the raw waveforms that produced it and can be easily sent back across the bus into a DMA buffer in host memory, if desired. In one embodiment the bank sum buffer into which partially accumulated chunks might be transferred in host memory. In this embodiment, the bank sum can be pulled from the DMA buffer and accumulated by the host controller (e.g., CPU) with previous bank sums corresponding to the same range of samples from other waveform sets.

The nature of the bank switching is such that it can be completed without knowledge of whether any particular iteration through a bank begins or ends an accumulated record. As a result, a new accumulated record can be started immediately, subject only to the waveform rearm time. If it is desired, the bank switch mechanism can be made aware of accumulation record boundaries to more easily support cases where N is not a whole multiple of n.

This method may allow the transfer of each partially accumulated chunk to the host as it is completed rather than waiting until all waveforms for the accumulated record have been acquired before beginning any transfer of the full accumulated record as is the case in the prior art. Combined with the ability for the hardware to switch banks on its own and to start new accumulated records with no waveform rearm time longer than that between waveforms within the same accumulated record, this offers inter-record rearm time advantages, allowing all inter-record rearm other than the waveform rearm time to be completely eliminated. The transfer across the bus need not hold up the start of the accumulations for the next chunk. Once the partially accumulated chunk is complete it can be moved to another holding buffer that can queue it up for bus transfer, if desired. The accumulator may then be cleared and values for the next chunk loaded. This may be repeated for the user-programmed waveform length.

It should be noted that this is a major departure from prior art approaches which require lengthy software intervention between some or most accumulated records for any acquisitions requiring a number of accumulated waveforms that exceeds the on-board capability of the product, e.g., whether in a (memory) accumulation mode or simultaneous acquisition and readout (SAR) mode. The prior art's software intervention after a number of accumulated records that fit on on-board memory drives large and variable inter-record dead time for continuously rearmed operation, which are both eliminated by the approach of FIGS. 7A-7I, while also offering improved specifications for key application requirements, including effectively unlimited number of accumulated records and numbers of waveforms per accumulated record, and waveform lengths that can theoretically be up to half the size of the memory bank as bus technology catches up, provided that the number of bits per sample in the accumulated record is limited to still maintain sufficient data compression to be sustainable for transfer across the bus.

In the event that the user chooses a configuration which does not provide adequate compression to ensure that each bank can be read, accumulated, and cleared from the accumulator by the time that the other bank finishes writing its raw data, the acquisition may overflow. This can occur for corner cases such as only summing a few waveforms per accumulated record. For these cases, the method of FIGS. 7A-8B may work only as well as some prior art approaches where the inter-record dead time is non-zero and waveforms are missed between accumulated records to allow additional time for readout. A counter to delay the start of acquisition of waveforms for subsequent accumulated records may thus be provided to prevent the overflow. Note, however, that this does not address the situation for the case that there are only a few waveforms per bank with a very long waveform length and where multiple memory banks are required to store the number of waveforms per accumulated record, which case would not be solved by the prior art approach either.

Unlike some prior art approaches, the above switching between memory banks may be completely controlled by hardware, and may require no software intervention, even when switching to a new accumulated record. Unlike prior art approaches, the bank switching does include an awareness of whether an accumulated record has just been completed that manifests as a remaining inter-record dead time in excess of the waveform rearm time that can not be eliminated by the changing the interval in which the accumulated record is read out of the digitizer. This combined with pipelined readout may enable the accomplishment of reaching zero inter-record dead time (with the possible exception of the waveform rearm time required after each waveform).

This method may thus enable the accumulator memory to reside inside an ASIC or programmable hardware element (e.g., an FPGA or other logic device where the memory can be built from any of various onboard components, e.g., FPGA BlockRAM, flip-flops, or the memory inside an FPGA DSP, etc., without sacrificing application waveform length. Having the accumulation memory inside a massively parallel FPGA device means the accumulation memory can be read and written each clock cycle and enables high memory throughput for parallel samples. Not having to meet the needs of accumulation memory via an external memory interface greatly eases the design and validation of the hardware and the component cost and board real estate. Rather than requiring memory throughput of at least 8× the acquisition data rate like some prior art approaches, this method only requires sustained memory throughput for each memory bank that is only slightly more than the data rate of the acquisition.

The specific number of samples in a chunk can be optimized based on the organization of the particular memory in use. There is a tradeoff between minimizing the effective access latencies of the external memory device vs. the amount of memory required in the FPGA for accumulator memory. As noted above, in various embodiments, this method may be implemented using a number of waveforms per bank, n, that is either fixed or a programmable.

Further regarding the above, embodiments of the above method may eliminate the inter-record time for most cases by transferring each chunk of the bank sum to the host as it is completed to start pushing data across the bus as soon as possible, and filling the empty bank with new waveforms for the next accumulated record while the full bank for the previous accumulated record is read out.

Extreme cases with only a few waveforms per accumulated record or short waveform lengths might incur excess context switching penalties from the memory, for some memory types. These types of applications, however, typically do not require as much memory in the first place and therefore are more likely to be satisfied by prior art approaches.

As noted above, embodiments of the above method may allow transfer of each chunk of the bank sum running sum to the host as it is completed rather than waiting until the entire accumulated record is calculated as is the case in the prior art, and moreover, may allow the original waveforms to be retained for applications where the number of waveforms per accumulated record can fit in the available deep memory. This can enable overlaying results derived from the accumulated record onto raw datasets, aiding debugging, or satisfying application requirements for raw data retention.

Exemplary Comparison Factors

The following describes exemplary comparison factors regarding the above method (with reference to FIGS. 6-8B) that may provide useful comparisons to prior art approaches. Note that the terms and values presented are exemplary only, and are not intended to limit the invention to any particular form, function, or performance.

Maximum Waveform Length: Enables waveform lengths as long as half the memory available in each memory bank, if the host bus could keep up (due to the relatively low approximately (digitizer resolution dependent) 1:2 compression rate on the data being returns when only 2 waveforms are stored per bank). Currently, with a 600 MB/s transfer rate that can be sustained in some PCI Express Gen 1×4 configurations, if the user is acquiring at 4 GS/s (assuming 8 bits per sample), a compression factor of at least 6.6:1 may be required. Depending on the exact implementation including resolution of the returned sum, this may mean that a minimum of 7 waveforms per memory bank would be sustainable, which would allow waveform lengths of up to $1/7^{th}$ the amount of memory per bank, so in some embodiments, 146 M-samples would be the maximum waveform length for current typical memory bank densities of 1 GB. As bus throughput and memory density increase the achievable waveform length continues to rise with this method;

Number of Waveforms per Accumulated Record: Number of accumulated records that can be acquired by the hardware between each software restart;

Inter-record Deadtime: As noted above, in some embodiments, the above method may almost eliminate inter-record deadtime;

Streaming: The ability to continuously stream accumulated records out of the product at least as fast as they are being produced to enable continuous acquisition and accumulation of data;

Accumulation memory throughput requirements; and

Support for on the fly changing of the number of waveforms per accumulated record.

Method 2: Hardware Implemented Chunk Based Double Buffered Waveform Accumulation with Deep Memory Storage of Partial Accumulated Records One embodiment of hardware implemented chunk based double buffered waveform data accumulation with deep memory storage of partial accumulated records is now described. For convenience, this approach may be denoted as method 2, although it should be noted that in some embodiments, method 2 may be considered to be a variant of method 1, as described above with reference to FIG. 6.

In method 2 (which in some embodiments, may be considered an extension of method 1 (of FIG. 6)), a portion of the deep memory of each bank may be reserved for storing the bank's running bank sum, rather than sending it out to another circuit or the host computer to catch and further accumulate. Thus, for example, in some embodiments, the method of FIG. 6 may (or the circuit may be further configured to) store the bank sums in reserved space in the first and/or second memory banks, and perform the accumulation of the first and second bank sums into the running accumulation of the set of waveforms using the reserved space.

For cases where N is an even multiple of n, each bank may hold the running sum for N/2 waveforms. A final sum of the two running sums may produce the accumulated record. Said another way, in one embodiment, to perform the above described accumulation of the first and second bank sums into a running accumulation of the set of waveforms, the circuit may be configured to store the bank sums in reserved space in the first and/or second memory banks, where the accumulation of the first and second bank sums into a running accumulation of the set of waveforms is performed using the reserved space.

To avoid losing resolution, the space allocated for the bank's running sum of partial (bank) accumulated records may account for the fact that the number of bits per sample grows as the number of waveforms to be summed, N, grows.

This approach may eliminate secondary accumulator or the host for further accumulating the partial (bank) accumulated records produced each time a bank completes a readout, and the corresponding memory for the second round of summing. This approach may potentially add inter-record dead time to that of method 1 (with reference to FIGS. 6-8B) if reading a second accumulated record running sum from memory and transferring it across the bus as required in method 2 takes longer than the time required by the host or secondary circuit to sum the most recent bank sum from method 1 due to its increased bit resolution per sample as a result of the secondary accumulation having been completed before potential bus transfer.

The most current accumulated record running sum may be available to hardware throughout the process, potentially divided across the two banks. This may enable various additional functions or applications, such as a "building" display or other output from the device as the data passes by on each bank switch.

The approach of method 2 may reduce the amount of deep memory available for raw waveform storage. For cases where the amount of storage required for a single waveform represents a large percentage of the memory available in a bank, this method might not be advisable due to the significant percentage impact this would have on how quickly the banks switch and thus the memory accesses are able to reach peak memory performance and switching overhead is absorbed in this scenario. However, for the more common cases where hundreds or thousands or tens of thousands of waveforms are stored per bank, having one fewer waveform per bank does not meaningfully affect the technique's ability to reach an efficient operating point as the banks can simply switch slightly sooner.

Method 3: Accumulation and Storage in Alternating Memory Banks The following describes embodiments of a method in which waveform data are accumulated and stored in alternating memory banks, referred to herein as method 3 for convenience.

As digitizer sample rates get faster and resolution gets higher, the amount of memory required to store samples representing a given time interval of interest increases. Storing large numbers of raw waveforms, even in a cyclical manner described above with respect to methods 1 and 2, becomes a luxury that can outstrip modern memory densities and transfer rates. Perhaps due to the amount of storage required per unit time, it may become more desirable to optimize for the longest record length possible. In this context, prior methods may be less appealing or useful.

Figure 9:
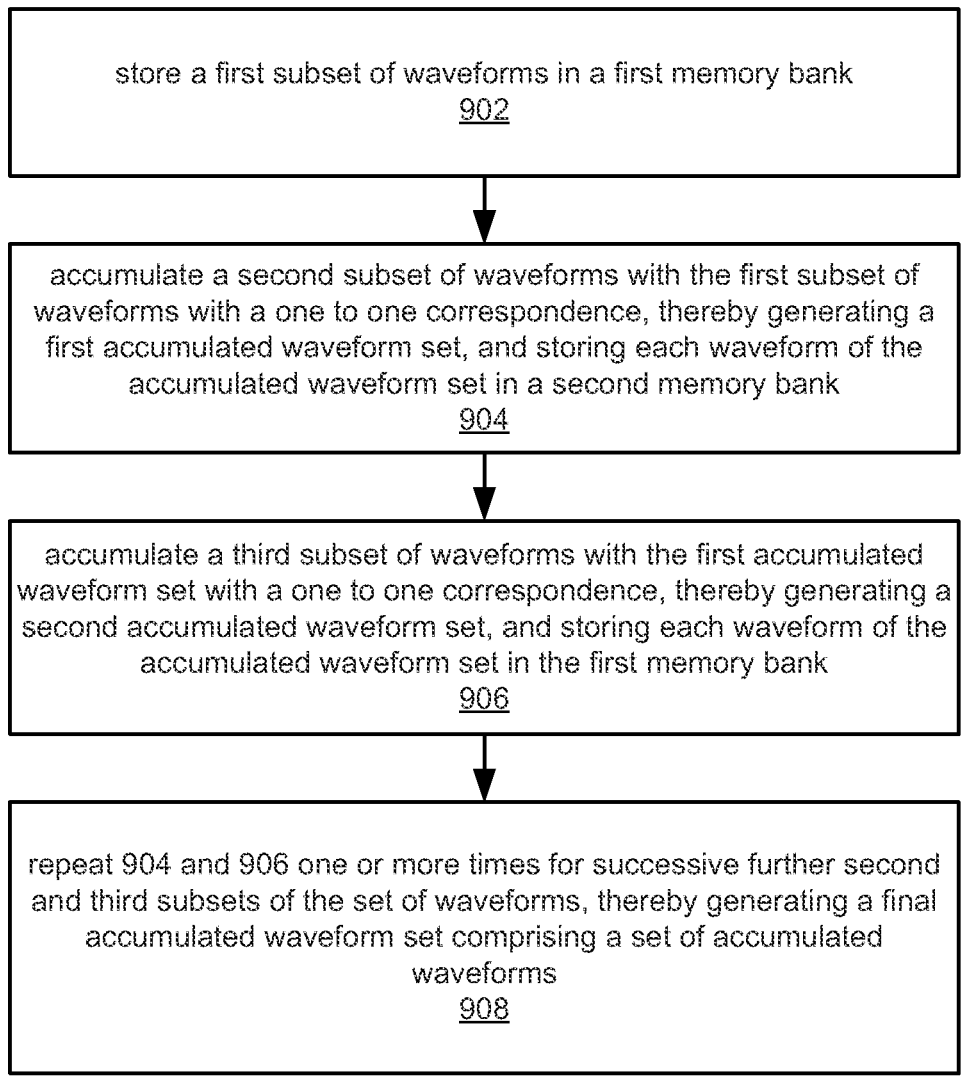
FIG. 9 is a flowchart diagram illustrating another method for accumulation of waveform data using alternating memory banks, according to one embodiment.

FIG. 9: Flowchart of Another Method for Accumulation of Waveform Data in Alternating Memory Banks FIG. 9 illustrates another method for accumulating waveform data in alternating memory banks, according to one embodiment. The method shown in FIG. 9 may be used in conjunction with any of the computer systems or devices shown in the above Figures, e.g., variants of the digitizer of FIG. 13, described below, among other devices. In various embodiments, some of the method elements shown may be performed concurrently, in a different order than shown, or may be omitted. Additional method elements may also be performed as desired. As shown, this method may operate as follows.

First, in 902, a first subset of waveforms (to be accumulated) may be stored in (written to) a first memory bank, e.g., memory bank A.

In 904, a second subset of waveforms may be accumulated with the first subset of waveforms with a one to one correspondence, i.e., on a one to one basis, thereby generating a first accumulated waveform set, and each waveform of the accumulated waveform set may be stored in the second memory bank. Note that "one to one correspondence" in this context means that a first waveform of the first subset of waveforms is accumulated with a first waveform of the second subset of waveforms, a second waveform of the first subset of waveforms is accumulated with a second waveform of the second subset of waveforms, and so forth. In other words, each waveform of the first subset of waveforms is accumulated with a respective (corresponding) waveform of the second subset of waveforms.

In 906, a third subset of waveforms may be accumulated with the first accumulated waveform set with a one to one correspondence, thereby generating a second accumulated waveform set, and storing each waveform of the accumulated waveform set in the first memory bank.

In 908, the accumulating and storing of 904 and 906 may be repeated one or more times in an iterative manner for successive further second and third subsets of the set of waveforms, thereby generating a final accumulated waveform set comprising a set of accumulated waveforms. In other words, the method elements 904 and 906 may be performed for each of successive further pairs of subsets of the set of waveforms until all waveforms in the set of waveforms have been accumulated and stored (in the first and second memory banks).

In one embodiment, the method may further include accumulating the final accumulated waveform set, thereby generating a final accumulated waveform. In other words, once all the corresponding waveforms in the different subsets of the set of waveforms have been accumulated respectively, these accumulated waveforms may themselves be accumulated to produce a single accumulated waveform, referred to as a final accumulated waveform. In various embodiments, this further accumulation may be performed by (the circuit of) the digitizer, or by a host computer.

For example, in one embodiment, the method may further include transferring the final accumulated waveform set to a host computer using a host computer bus and DMA, and storing the final accumulated waveform set in host computer memory, then accumulating, via the host computer, the final accumulated waveform set, thereby generating the final accumulated waveform.

Moreover, in some embodiments, the accumulating of the second subset of waveforms with the first subset of waveforms and the accumulating of the third subset of waveforms with the first accumulated waveform set may be performed via an accumulation process for each waveform. For at least one of the waveforms, one or more properties of the waveform or of a sideband signal associated with the waveform may be inspected (or determined), and the accumulation process may be dynamically modified (e.g., "on the fly") based on the one or more properties.

FIGS. 10A-10I illustrate an exemplary embodiment of method 3, following the illustration conventions of FIGS. 7A-7I.

In one exemplary embodiment of this method, the first set of up to n waveforms may be stored in (written to) bank A, as with the above methods. In some exemplary embodiments, n may be 1, meaning that only one waveform fits in a memory bank at a time. Using this method, multiple accumulated records N could be created in the digitizer on a non-continuous basis. For example, embodiments include n=1, and n>1.

For example, n=1 can be desirable for obtaining the longest waveform length. An example of a case in which n>1 is useful is when it is desirable to separate the incoming data into separate sums based on information that is not known until the waveform's arrival. While this case is not explicitly depicted in the figures which show sequential storage of the raw waveforms into memory, the methods shown in the figures are accurate if n is taken to be equal to 1, and thus cover this important case.

Using n>1 may be useful to accumulate waveforms into separate accumulated records based on information that is not available a priori. This could be useful for acting on a marker that indicates whether the waveform should go into one accumulated record or another. By allowing storage of data for an accumulation of n accumulated records in progress in the hardware, arriving waveforms may be directed into particular "slots" in the memory banks. An embodiment with n=2 is envisioned where, at the time of the trigger, a digital input to the digitizer is driven high or low by an external device to indicate whether the waveform to be acquired is associated with a particular unit under that is "good" or "bad." For such an application, it might be useful to have separate accumulated records for each type of unit under test to allow inspection of differing characteristics between the two types of units under test. "Good" or "bad" units under test could come in any order, potentially causing multiple sequential waveforms to be sent to the same running sum and having no pre-defined N for either accumulated record at the time of configuration.

These individual running sums move between corresponding locations in the two banks via the summer. Each may move through the summer and be summed with the incoming waveform as upon arrival of a new waveform destined for that running sum as indicated by the condition to define which waveforms are destined for which accumulated sum. This movement from bank to bank is independent of the location of the other running sums. In this manner, multiple accumulated records can be produced of varying number of waveforms per accumulated record based on information that becomes available on the fly at the time of waveform arrival rather than by a preconfigured sequence.

Figure 10A:
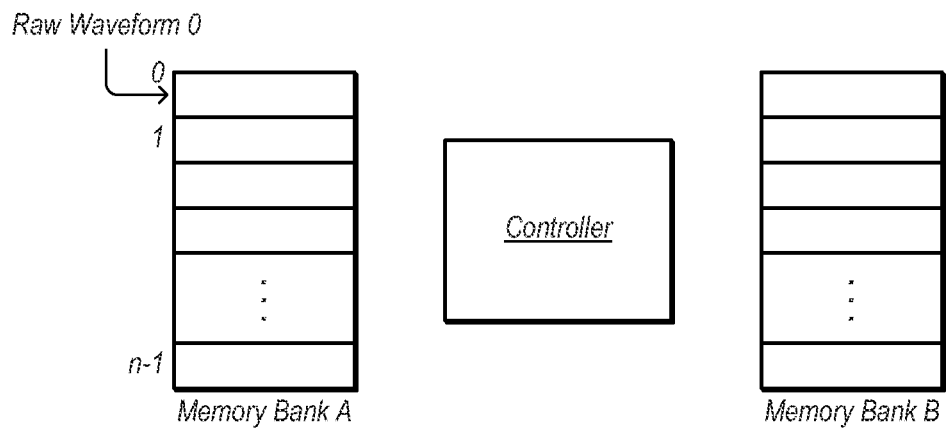
FIGS. 10A-10I illustrate hardware implemented accumulation of waveform data using alternating memory banks, according to one embodiment.
Figure 10B:
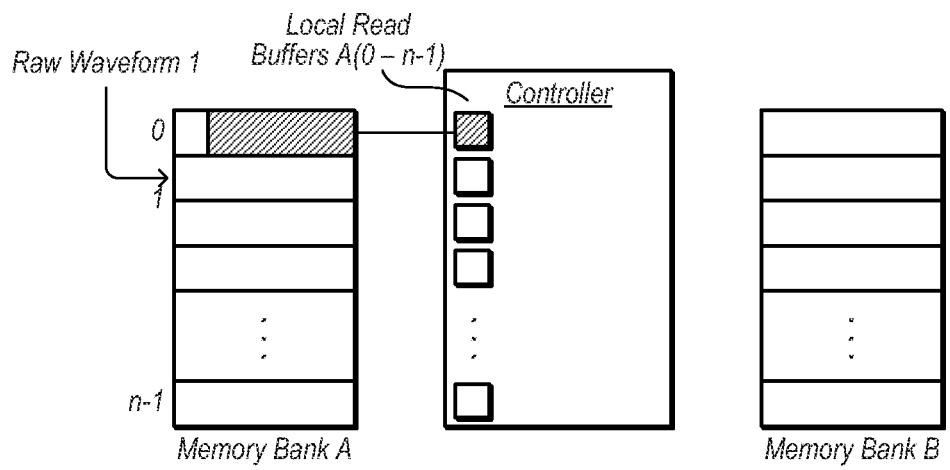

FIGS. 10A-10I illustrate an embodiment of the method of FIG. 9 which, like that of FIG. 7A, involves acquiring multiple sets of n waveforms (waveforms 0 through n−1). In this embodiment n=N. FIG. 10A shows that the first raw waveform, waveform 0, is written to memory bank A. FIG. 10B illustrates writing the second raw waveform, waveform 1, to memory bank A, while concurrently reading (a small portion of) waveform 0 from memory bank A and writing the data to a local read buffer, specifically, local read buffer A(0), where the corresponding portion of the memory bank A is shown as clear or empty (which may or may not actually retain the data). The local read buffer serves the purpose of overcoming any read latency of the memory in bank A which might otherwise hamper timely access to the previously stored waveform samples at the time of arrival of the corresponding samples in the arriving waveform. Alternatively, to avoid taxing the memory interface with the additional read of recently written data, the small portion of data to be stored in the local read buffer can be written either to both locations or only to the local read buffer, as convenient. An additional alternative would be to buffer the incoming waveform data as much as necessary to overcome the read latency of the memory.

Figure 10C:
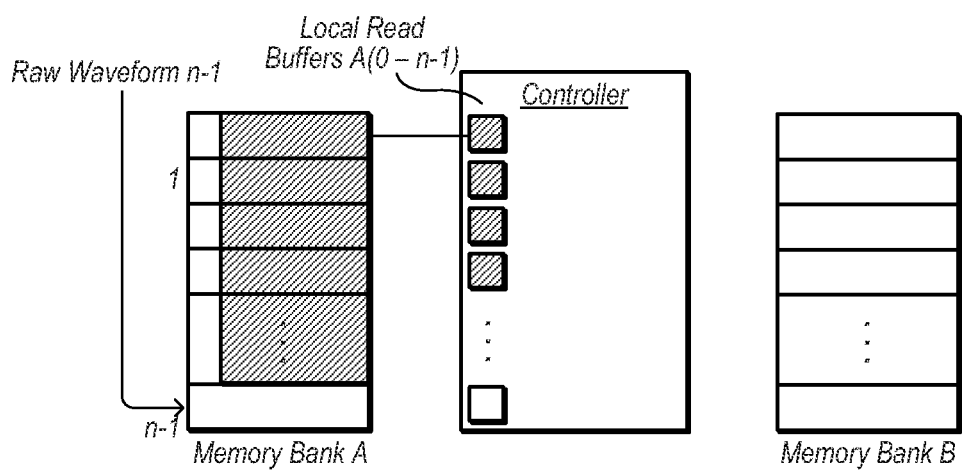

FIG. 10C illustrates completion of the data writes to bank A (of the current set of n waveforms), where the data of raw waveform n−1 is shown being stored in the bank, which subsequently holds waveforms 0 through n−1. Note that each of these is the start of an accumulated record. Note that the portion of waveform 0 data is still stored in the local read buffer and that each subsequently stored waveform may have a similar local read buffer A into which (a portion of) waveform 0 from memory bank A is written.

Now, when waveforms [n, 2*n−1] arrive (or begin arriving), rather than storing them in raw form to bank B as with method 1, the waveforms stored in bank A may be read out and summed with the incoming waveforms. In this case, waveform 0 may be summed with waveform n, 1 with n+1, and so forth, as each new waveform arrives. The resulting running sums may then be stored into bank B at locations corresponding to the location in bank A from which the previously store waveform input to the sum came. The same prefetching happens on data as it enters memory bank B by any of the methods previously described.

The figures as drawn do not depict a secondary accumulation operation such that the N sums are combined into a single accumulated record. This is the case where n/=N and is envisioned as part of method, using a secondary accumulator as described in method 1.

Figure 10D:
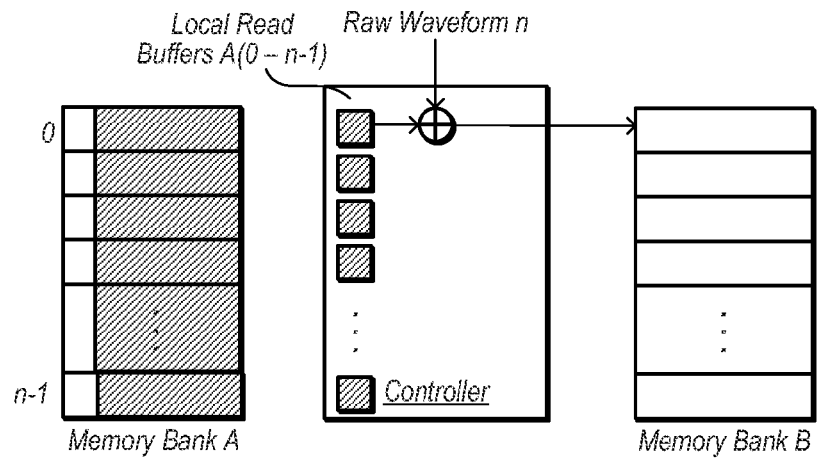

FIG. 10D illustrates such an accumulation of waveform 0 data from bank A with incoming raw waveform n, with the result stored in bank B, as indicated by the left most fill of bank B, after which the first "slot" in bank B holds the running sum (partial accumulation) of waveform 0+waveform n. Note that in this embodiment, the previously stored waveform data is all passed through the local read buffer. This is not necessarily the case in all embodiments where the local read buffer might only serve the purpose of overcoming any read latency of the memory in bank A and then is subsequently bypassed.

Figure 10E:
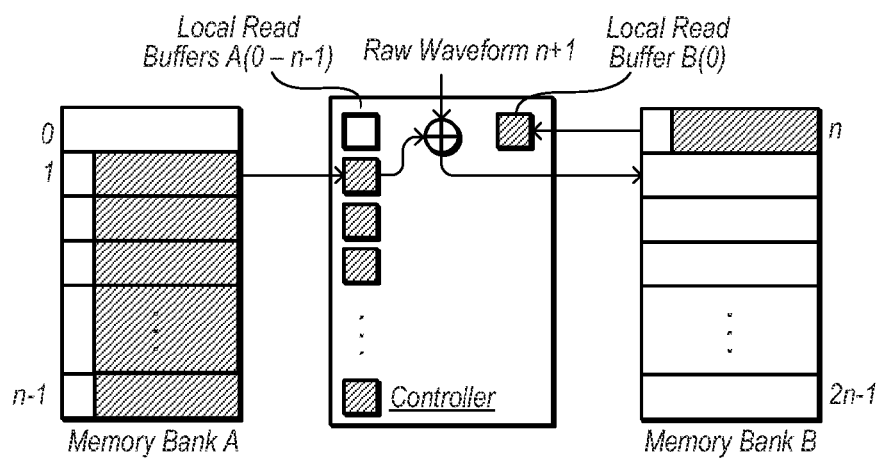
Figure 10F:
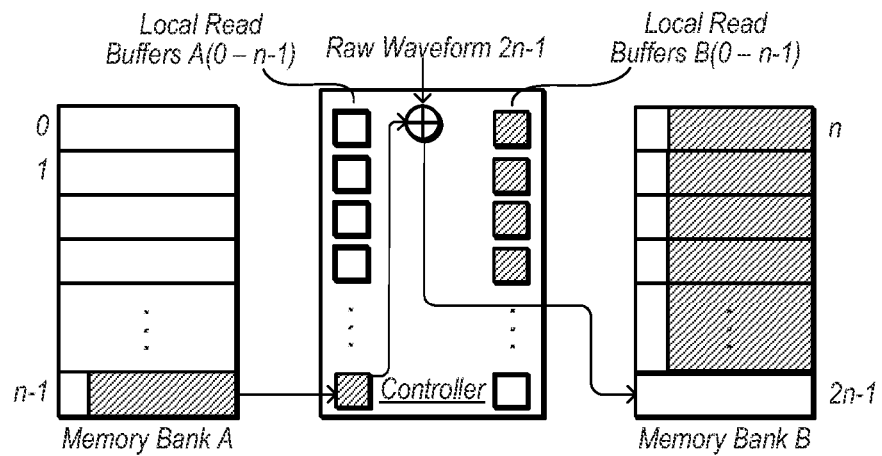

FIG. 10E shows the next accumulation, where a portion of data for waveform 1 is stored in the local read buffer, then summed with incoming raw waveform n+1, with the resulting sum stored in memory bank B. Note that concurrent with this accumulation, a first portion of the prior accumulated waveform data which was stored in the first "slot" of bank B is shown being stored in another local read buffer, specifically, local read buffer B(0). FIG. 10F shows accumulation of raw waveform 2n−1 with the last previously stored waveform data of bank A (via local read buffer A(n−1)), and storing the resulting sum into the last waveform slot of bank B after which the last "slot" in bank B holds the running sum (partial accumulation) of waveform n−1+waveform 2*n−1.

Figure 10G:
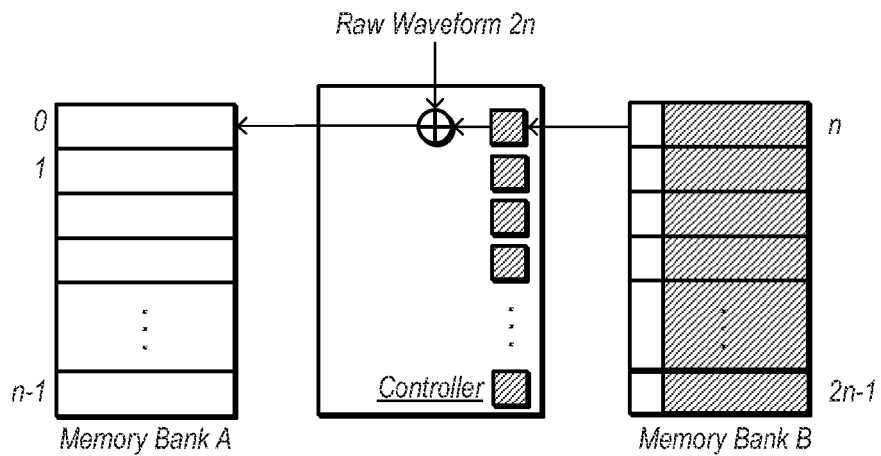

Then, when waveforms [2*n, 3*2−1] arrive, the running sum stored in bank B may be read out and summed with the incoming waveforms, via the corresponding local read buffer B. FIG. 10G specifically illustrates the accumulation or summing of incoming raw waveform 2n with running sum data in bank B, specifically, the previously calculated sum of waveforms 0+waveform n, via local read buffer B(0) summed with waveform 2n.

Figure 10H:
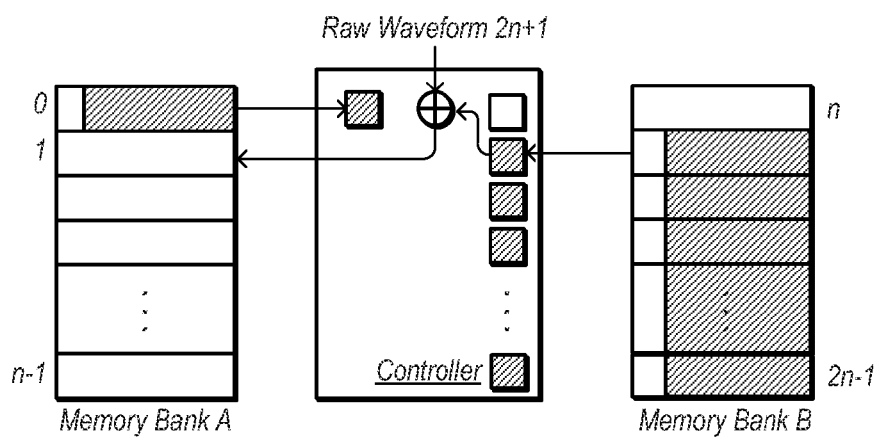

Similarly, FIG. 10H illustrates the accumulation or summing of incoming raw waveform 2n+1 with the running sum of waveform 1 and waveform n+1 previously stored in bank B, via local read buffer B(1). FIG. 10G further shows storing of (a portion of) the running sum data in bank A into local read buffer A(0), e.g., in preparation for subsequent accumulation of the bank A (partial accumulation) waveform data.

Figure 10I:
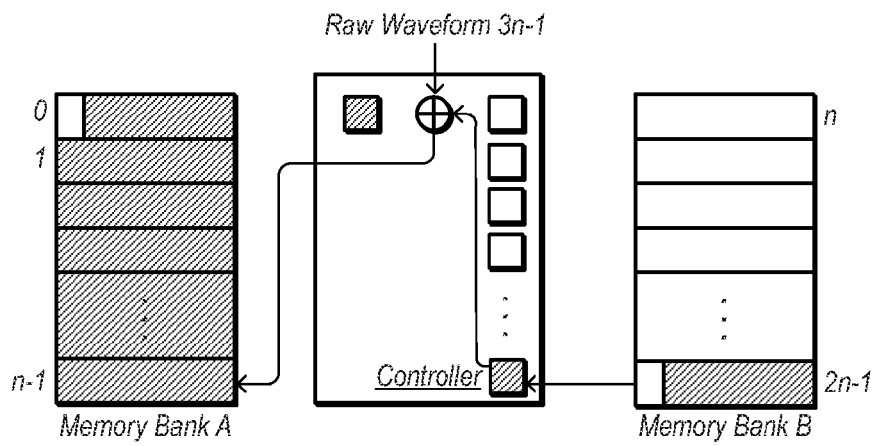

FIG. 10I shows accumulation of incoming raw waveform 3n−1 with the running sum data stored in the last slot of bank B, specifically, the running sum data of waveform n−1 and waveform 2n−1, which was previously stored in bank B, via local read buffer B(n−1). Consequently, after this stage of accumulation, bank A may contain running sums of waveforms (partial accumulation) of [(waveform 0+waveform n+waveform 2n] . . . [waveform n−1+waveform 2n−1+waveform 3n−1]. Note, however, that a portion of the first running sum waveform data may be stored in local read buffer A(0), as shown. The alternation between memory banks may continue as shown for further acquired raw waveforms. For cases where N is a whole (integer) multiple of n, the accumulated record is in the memory bank which accepted the final sum.

Again, note that special provisions may be required for cases when N is not a whole (integer) multiple of n, e.g., either transferring the running sum for the "missing" waveforms to the other memory such that the final sum exists in one bank, or by configuring the readout logic to take into account that the two separate banks each contain part of the accumulated record.

In one embodiment, to avoid losing resolution, this method may require increasing the number of bits per sample as the number of waveforms to be summed, N, grows. This may further reduce the number of waveforms that can be stored per memory bank, again motivating an implementation where n is 1. In this case, this method enables waveform lengths for which the accumulated record can be stored in half of the total deep memory.

In a basic embodiment of this method (method 3), some degree of burden may be placed on each memory bank to interleave reads and writes successfully in order to overcome memory latency and be ready to provide inputs to the accumulator when waveform n (and the first waveform of each bank switch) arrives. Enough data from waveform 0 needs to have been successfully read out from bank A into the local read buffer A while subsequent data was being written to the bank in order to overcome the latency of the memory and have data queued up for the accumulator when the first sample of waveform n arrives. Depending on how much throughput margin is available on the memory interface beyond what is required to keep up with the incoming acquisition data and on the "penalty" (e.g., cost) for switching between reads and writes associated with the memory technology in use, this may be problematic for some implementations. However, the burden is usually small, especially since the focus for this implementation may often be long record lengths.

A variety of extensions to method 3 are possible. As illustrated in FIGS. 10A-10I, in some embodiments, enough data from waveform 0 was pulled into a local read buffer (A or B) situated between the deep memory and the accumulator in order to overcome potential memory latency. Doing so may prevent missed or offset waveforms during bank switching operations within or between accumulated records. This buffer may further hide memory architecture performance hiccups such as DRAM refresh cycles. Rather than burdening the memory interface with the need to read data during the ongoing writes of waveforms [0, n−1], however, one embodiment simply stores enough data from waveform 0 for this need in a local read buffer as it arrives rather than writing to and reading back from the deep memory. In this case, that particular data may not necessarily be sent to be stored to the deep memory at all.

As also indicated above, in some embodiments, the local read buffer may be dedicated per bank, or, alternatively, may be implemented as a single unit shared between the banks, depending on various tradeoffs, including whether the implementation requires handling memory architecture performance hiccups or compact size.

Note that in various embodiments of method 3, the most current accumulated record running sum may be available to hardware throughout the process, potentially divided across the two banks, which may enable applications such as a "building" display or other output from the device as the data passes by on each bank switch. Moreover, embodiments of this approach may avoid development of different addressing schemes for reading and writing. Finally, this method may be suitable for optimizing for longest record length.

Method 4: Accumulation and Storage in Alternating Memory Banks: Variant Approach The following method is referred to as method 4 for convenience. In embodiments of this method, both banks of memory may be used to acquire a single waveform, thus making n=½. Note that this maximizes the waveform length relative to all other methods described herein. When writing data to memory, the memory controller may alternate between banks by writing a chunk of the waveform to bank A and then switching to write the next chunk of the waveform to bank B. The size of the waveform chunk written to each bank between switches may depend on the memory architecture used, but may be designed to optimize read and write bandwidth. The waveform length may be an even multiple of the selected waveform chunk size.

Figure 11:
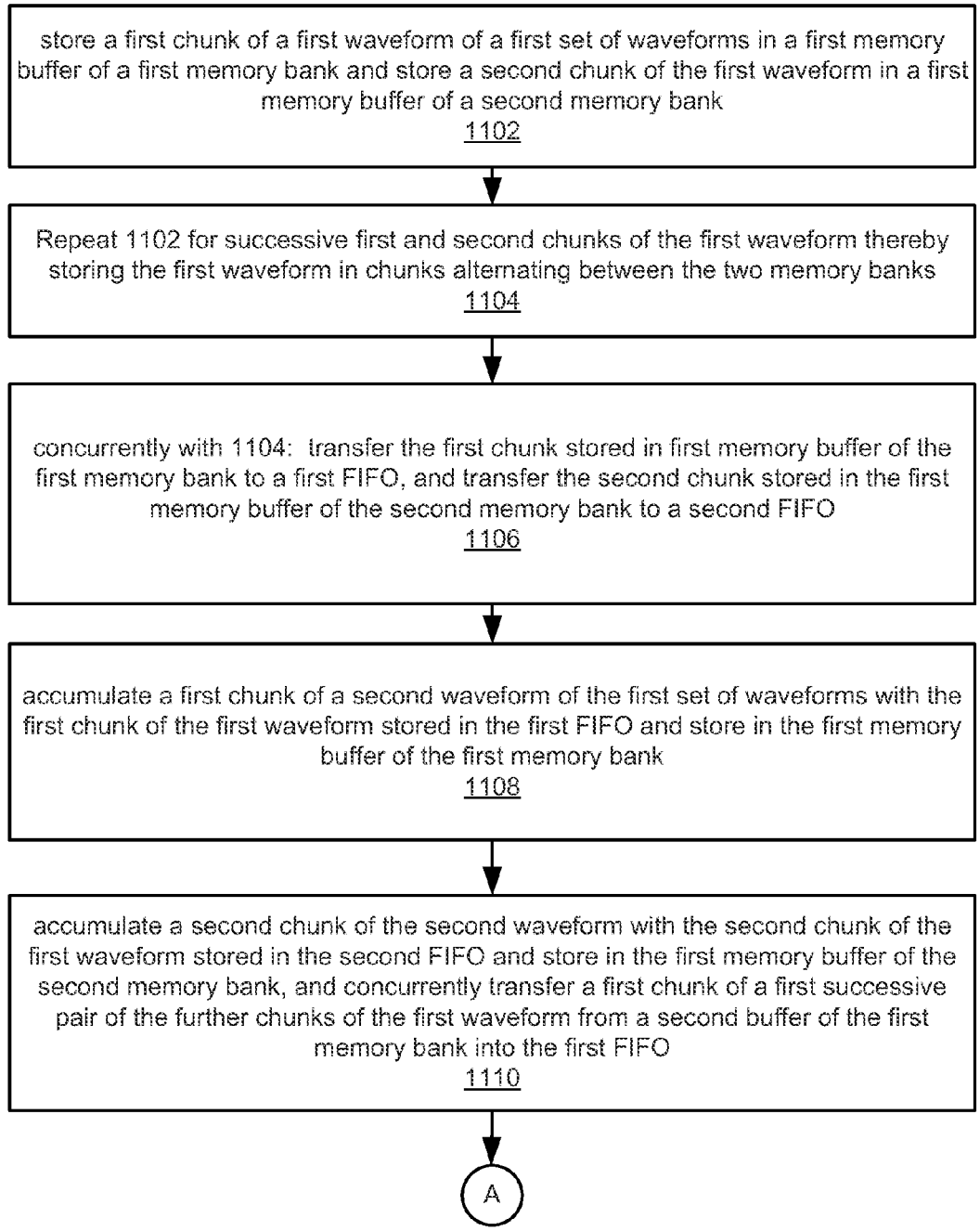
FIG. 11 is a flowchart diagram of a method for waveform accumulation and storage in alternating memory banks, according to one embodiment.
Figure 11:
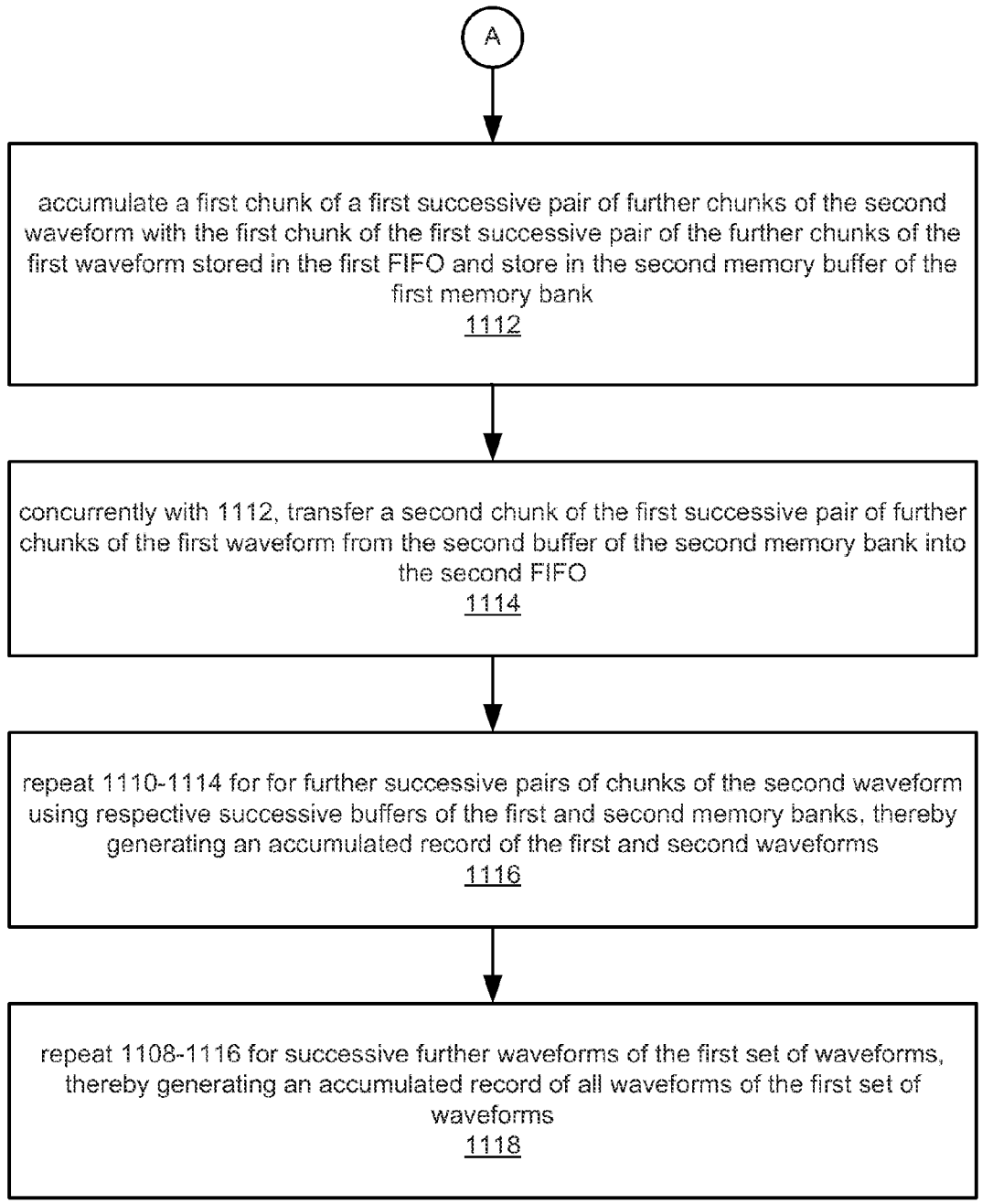

FIG. 11: Flowchart of a Method for Accumulation and Storage of Waveform Data in Alternating Memory Banks FIG. 11 illustrates a method for accumulating and storing waveform data in alternating memory banks, according to one embodiment. The method shown in FIG. 9 may be used in conjunction with any of the computer systems or devices shown in the above Figures, e.g., variants of the digitizer of FIG. 13, described below, among other devices. In the exemplary embodiment described, the device is a digitizer that includes a circuit, a first memory bank, coupled to the circuit, and a second memory bank, coupled to the circuit, where the circuit is configured to perform the method. In various embodiments, some of the method elements shown may be performed concurrently, in a different order than shown, or may be omitted. Additional method elements may also be performed as desired. As shown, this method may operate as follows.

First, in 1102, a first chunk of a first waveform of a first set of waveforms may be stored in a first memory buffer of the first memory bank, and a second chunk of the first waveform may be stored in a first memory buffer of the second memory bank.

In 1104, the storing of 1102 may be repeated respectively for successive pairs of further chunks of the first waveform, thereby storing the first waveform in chunks alternating between successive buffers in the first and second memory banks.

In 1106, concurrently with 1104, the first chunk stored in first memory buffer of the first memory bank may be transferred to a first FIFO (i.e., queue or other FIFO structure), and the second chunk stored in the first memory buffer of the second memory bank may be transferred to a second FIFO. In other words, while the successive pairs are being stored in the first and second memory banks, the first and second chunks may be retrieved from the respective first memory buffers of the first and second memory banks, and respectively stored in the first and second FIFOs.

In 1108, a first chunk of a second waveform of the first set of waveforms may be accumulated with the first chunk of the first waveform stored in the first FIFO and stored in the first memory buffer of the first memory bank.

In 1110, a second chunk of the second waveform may be accumulated with the second chunk of the first waveform stored in the second FIFO and (the accumulation) stored in the first memory buffer of the second memory bank, and concurrently, a first chunk of a first successive pair of the further chunks of the first waveform may be transferred from a second buffer of the first memory bank into the first FIFO.

In 1112, a first chunk of a first successive pair of further chunks of the second waveform may be accumulated with the first chunk of the first successive pair of the further chunks of the first waveform stored in the first FIFO, and (the accumulation) stores in the second memory buffer of the first memory bank.

In 1114, concurrently with 1112, a second chunk of the first successive pair of further chunks of the first waveform may be transferred from the second buffer of the second memory bank into the second FIFO.

In 1116, method elements 1110-1114 may be repeated (performed) for further successive pairs of chunks of the second waveform using respective successive buffers of the first and second memory banks, thereby generating an accumulated record of the first and second waveforms.

In 1118, method elements 1108-1116 may be repeated (performed) for successive further waveforms of the first set of waveforms, thereby generating an accumulated record of all waveforms of the first set of waveforms.

Thus, embodiments of the above method may utilize chunk based waveform accumulation in alternating memory banks to efficiently accumulate waveform data.

FIGS. 12A-12H illustrate an exemplary embodiment of the method of FIG. 11, where waveform data are accumulated in a chunk wise manner using alternating memory banks.

Figure 12A:
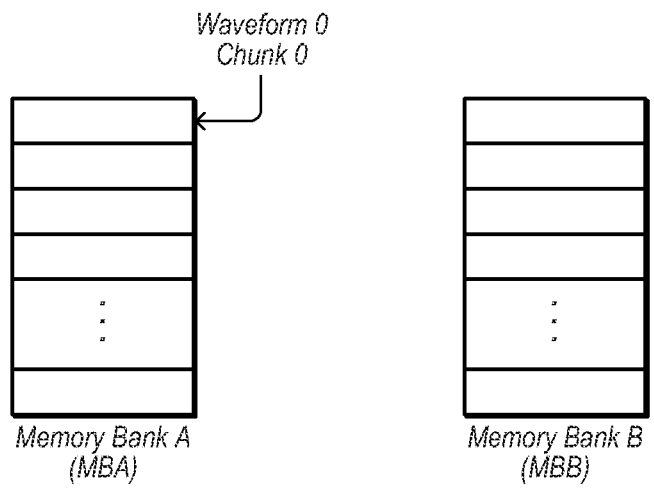
FIGS. 12A-12H illustrate hardware implemented waveform data accumulation and storage in alternating memory banks, according to one embodiment.
Figure 12B:
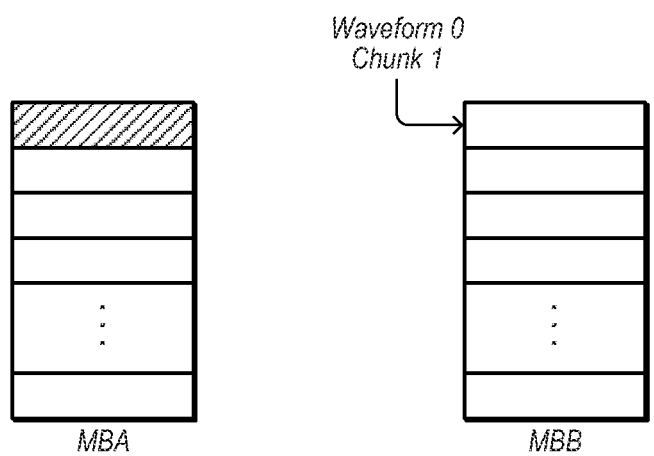
Figure 12C:
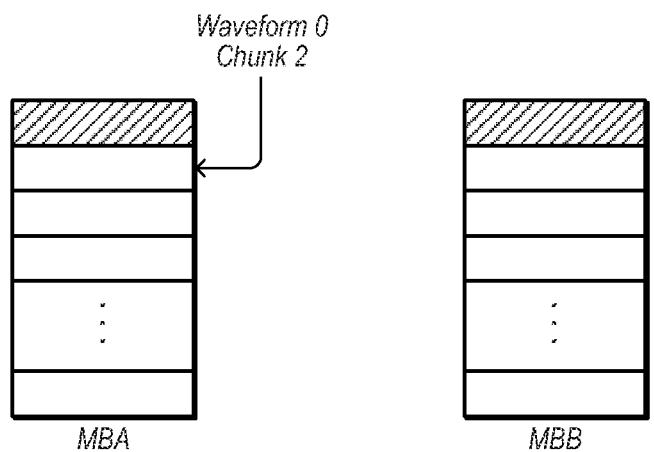
Figure 12D:
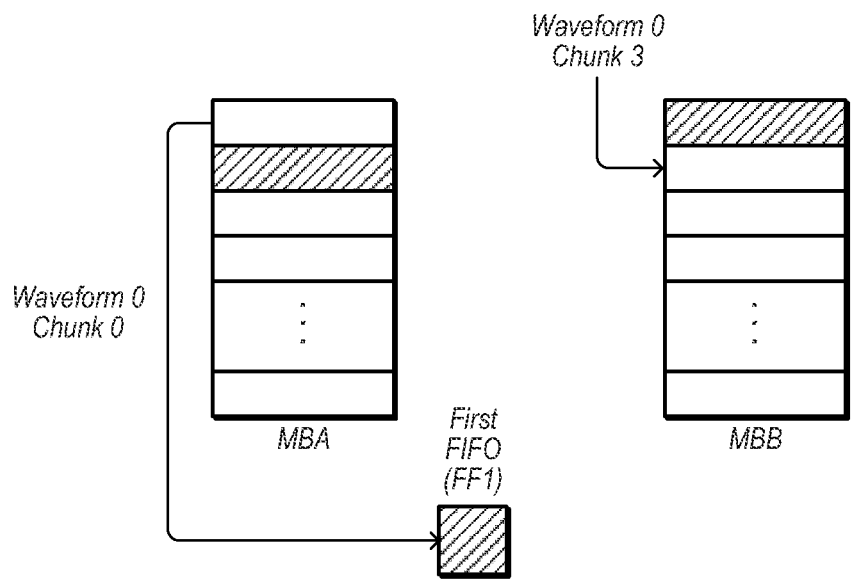
Figure 12E:
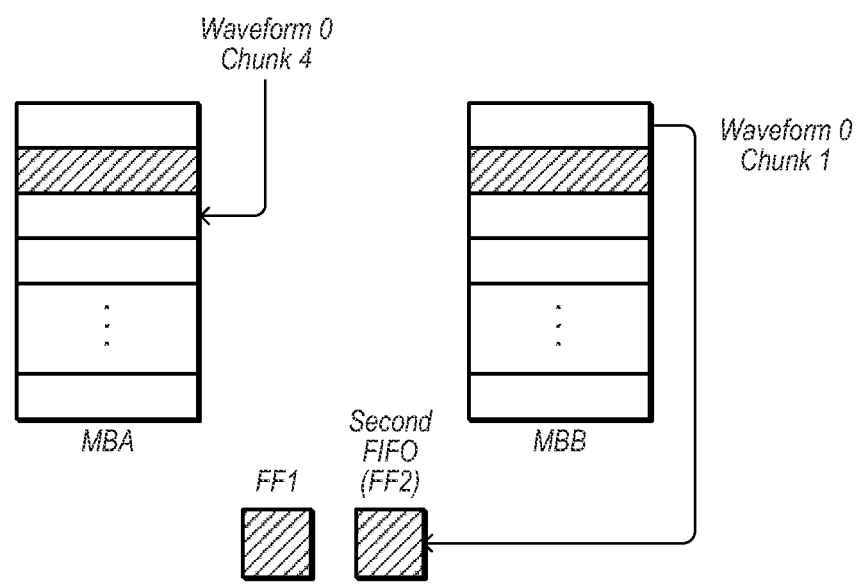

When the first record is acquired, the data may be written as received, alternating between memory banks A and B by the defined waveform chunk, as illustrated in FIGS. 12A, 12B and 12C, wherein successive chunks (e.g., chunk 0, chunk 1, chunk 2, as shown, and so forth) are written to a first memory bank, memory bank A (MBA), and to a second memory bank, memory bank B (MBB) in alternative fashion, i.e., switching back and forth between them for successive writes. In some embodiments, as the first record acquisition is in progress, reads to the beginning of the buffer may be made, pre-fetching the previously written data and storing it in a local FIFO. At this point, the method may be writing to one bank of memory and at the same time reading from the other, as illustrated in FIGS. 12D and 12E. In other words, as shown in FIG. 12D, the previously stored data of waveform 0, chunk 0 (see FIG. 12A/12B) may be read from MBA and written to a first FIFO (FF1) while waveform 0, chunk 3 is being written to MBB. Subsequently, per FIG. 12E, the previously stored data of waveform 0, chunk 1, is read from MBB and written to a second FIFO (FF2) while waveform 0, chunk 4 is being written to MBA.

Figure 12F:
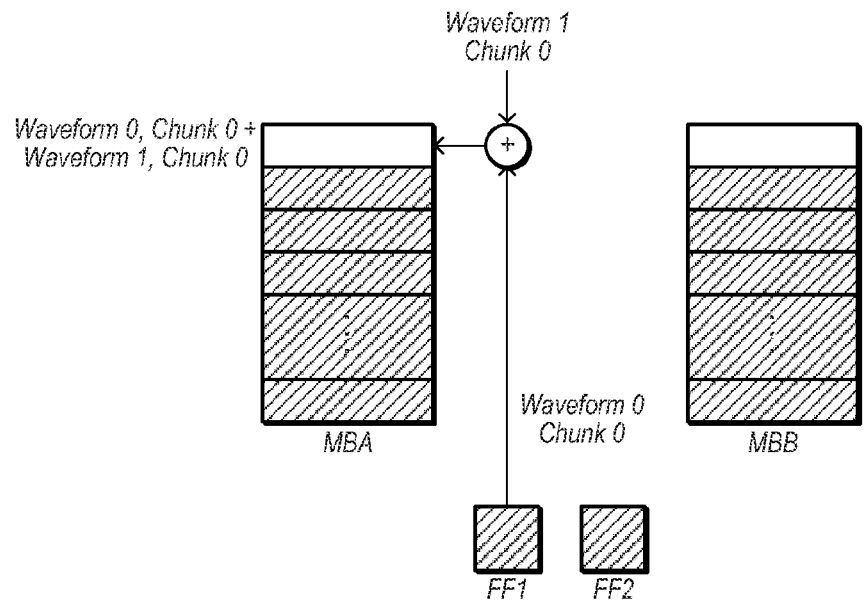
Figure 12G:
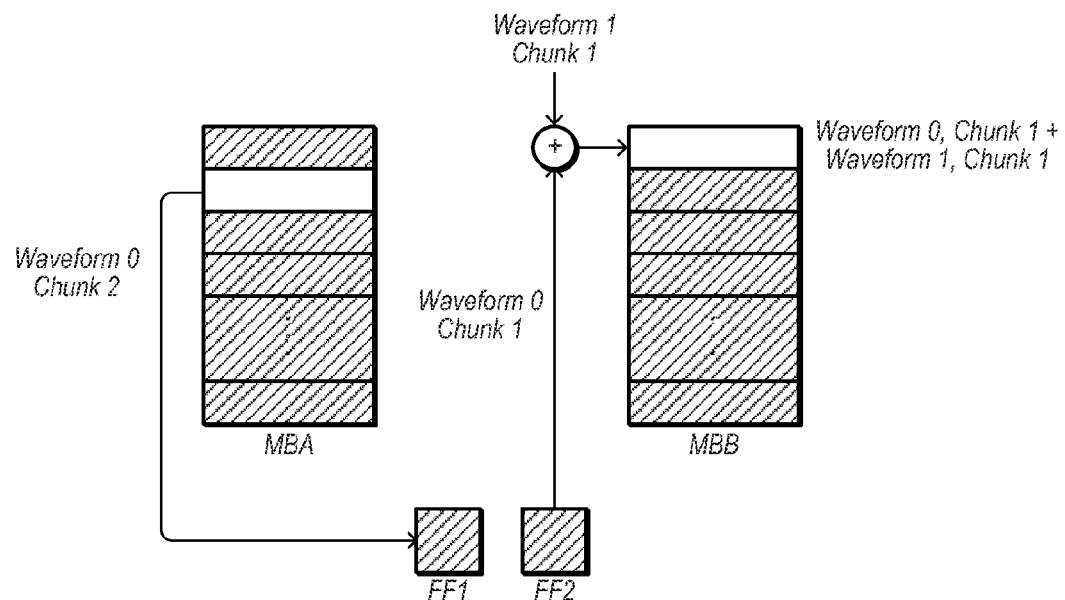
Figure 12H:
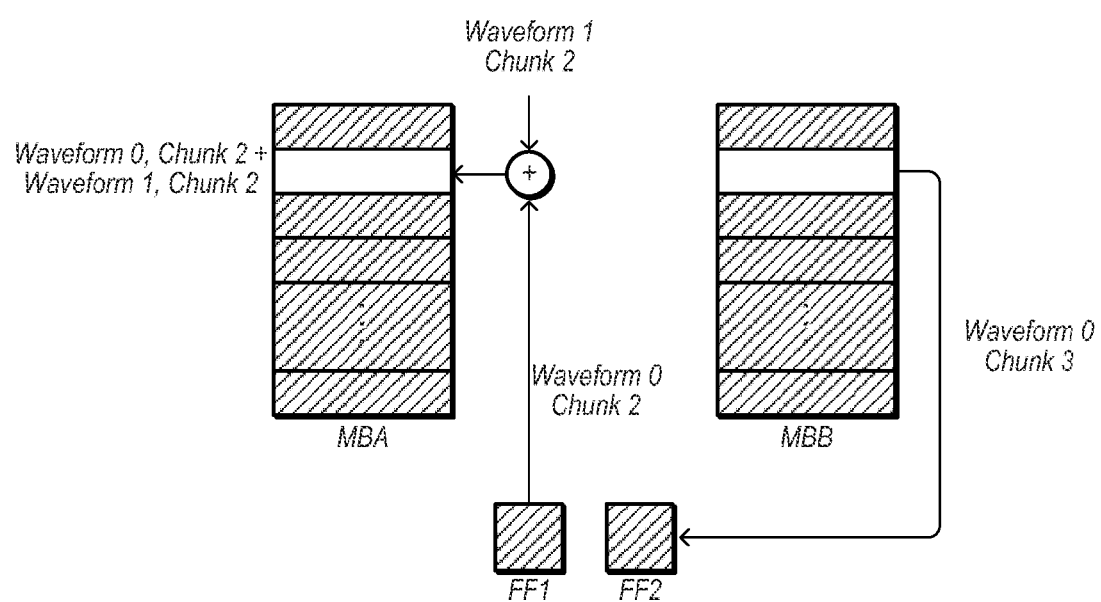

As the second waveform is acquired, the pre-fetched chunks may be used to calculate the accumulation of the waveform chunk previously acquired with the new one, by adding it to the corresponding waveform chunks of the new waveform acquired and the result data may be written in the same fashion as the first waveform chunk, effectively overwriting old data. In other words, the first chunk of the accumulated result is written to memory bank A, and the second chunk to bank B and so on. From this point on any receipt of a new waveform chunk may trigger a (previously stored) waveform chunk to be read from memory, as illustrated in FIGS. 12F, 12G and 12H. In other words, as shown in FIG. 12F, incoming waveform 1, chuck 0, is accumulated (or summed) with the waveform 0, chunk 0 data in FF1, and stored in MBA (top slot, as shown). Similarly, per FIG. 12G, while waveform 0, chunk 2, is read from MBA and written to FF1, the waveform 0, chunk 1, data that was stored in FF2 in FIG. 12E is accumulated with incoming waveform 1, chunk 1, data and stored in MBB (top slot, as shown). Then, per FIG. 12H, the method may further read previously stored waveform 0, chunk 3, from (the second slot of) MBB and written to FF2, while incoming waveform 1, chunk 2, data are accumulated with waveform 0, chunk 2, data from FF1 and stored in (the second slot of) MBA. Note that at the end of each waveform (i.e., after each waveform has been acquired and accumulated), the contents of memory may thus reflect the accumulated waveform up to that point. This alternating read/accumulate/write process may be repeated in an iterative manner until all the waveforms of the set have been accumulated.

Further Exemplary Embodiments

Further regarding the method of FIG. 11, in some embodiments, once method element 1118 has been performed, the first FIFO may contain a first chunk of the accumulated record of all waveforms of the first set of waveforms, the second FIFO may be empty, and remaining chunks of the accumulated record of all waveforms of the first set of waveforms may be contained in the first and second memory banks in interleaved fashion. The method may further store a first chunk of a first waveform of a second set of waveforms in the first memory buffer of the first memory bank, and concurrently transfer the second chunk of the accumulated record of all waveforms of the first set of waveforms stored in the first buffer of the second memory bank to the second FIFO. Additionally, concurrently with storing the first chunk and transferring the second chunk, the method may transfer the first chunk of the accumulated record of all waveforms of the first set of waveforms stored in the first FIFO to a high speed serial interface (HSSI), as illustrated in an exemplary manner in FIGS. 14A-14D, described below.

The method may also store a second chunk of a first waveform of the second set of waveforms in the first memory buffer of the second memory bank, and concurrently transfer a first chunk of a first successive pair of the further chunks of the accumulated record of all waveforms of the first set of waveforms stored in a successive buffer in the first memory bank to the first FIFO. Concurrently with storing the second chunk and transferring the first chunk (of the first successive pair of the further chunks of the accumulated record of all waveforms of the first set of waveforms stored in a successive buffer in the first memory bank) the method may transfer the second chunk of the accumulated record of all waveforms of the first set of waveforms stored in the second FIFO to the HSSI, and may repeat the above method elements respectively for successive pairs of further chunks of the first waveform of the second set of waveforms, thereby storing the first waveform in chunks in successive buffers in the first and second memory banks in alternating fashion, storing the first chunk of the first waveform of the second set of waveforms in the first FIFO and transferring all the chunks of the accumulated record of all waveforms of the first set of waveforms to the HSSI.

At this point, the first FIFO may store a first chunk of first waveform of a second set of waveforms, the second FIFO may be empty, and remaining chunks of the first waveform of a second set of waveforms may be stored (contained) in the first and second memory banks in interleaved fashion, and in some embodiments, the method may accumulate a first chunk of a second waveform of the second set of waveforms with the first chunk of the first waveform stored in the first FIFO and store (the accumulated first chunks) in the first memory buffer of the first memory bank, and may concurrently with transfer the second chunk of the first waveform of the second set of waveforms stored in the first memory buffer of the second memory bank to the second FIFO. The method may also accumulate a second chunk of the second waveform with the second chunk of the first waveform stored in the second FIFO and store in the first memory buffer of the second memory bank, and concurrently transfer a first chunk of a first successive pair of the further chunks of the first waveform from a second buffer of the first memory bank into the first FIFO.

The above chunk-wise accumulation of the second waveform with the first waveform may be repeated for further successive pairs of chunks of the second waveform using respective successive buffers of the first and second memory banks, thereby generating an accumulated record of the first and second waveforms. Similarly, the above (including the repeating) may itself be repeated for successive further waveforms of the second set of waveforms, thereby generating an accumulated record of all waveforms of the first set of waveforms.

As noted above, in various embodiments, in various embodiments, the circuit of the digitizer that performs the above method elements may include or be a programmable hardware element or an application specific integrated circuit (ASIC), or a combination of the two. In one embodiment, the first and second memory banks (of the digitizer) may be integrated into the circuit. Alternatively, in other embodiments, the first and second memory banks may be external to the circuit.

Using embodiments of this method (method 4/method of FIG. 11), it may be possible to have virtually (or substantially) zero dead time between waveforms. Furthermore, it may be possible to have substantially zero dead time between accumulated waveforms by taking advantage of the read operation that would normally take place but is not necessary when starting a new accumulation operation to stream the data to a different memory or the host system (see path labeled "To HSSI" in FIG. 13, described below). As used herein, the term "substantially" may indicate different levels of tolerance, based on the particular application or case being considered. For example, in some embodiments, it may mean "less than 0.1%" of the accumulation time for a waveform, while in other embodiments, it may mean "less than 0.2%", "less than 1%", "less than 5%", "less than 10%", and so forth, as desired.

In some embodiments, method 4 may require that the memory can sustain the sum of the read and write operations. The bandwidth requirement on the memory may be required to take into account the overhead of switching between read and write operations. The local FIFOs may (should) be chosen of an appropriate size to compensate for the latency of the memory read operations.

Various embodiments of method 4 may maximize the available memory to extend the possible waveform length, which may be critical as sample rates increase. Additionally, embodiments of method 4 may allow for zero dead time between waveforms on an accumulation operation by pre-fetching data from memory and storing it in local FIFOs, and may allow for zero dead time between accumulation operations by streaming the result to a second memory or host interface while the first waveform of a new accumulation operation is acquired. This operation may require a stream interface that matches the input and output bandwidth to local storage. The average bandwidth may be divided by the number of waveforms accumulated, which may allow the transfer from local storage to host memory on a slower system bus. Embodiments of method 4 may allow for streaming of partial results with the streaming strategy described above.

Figure 13:
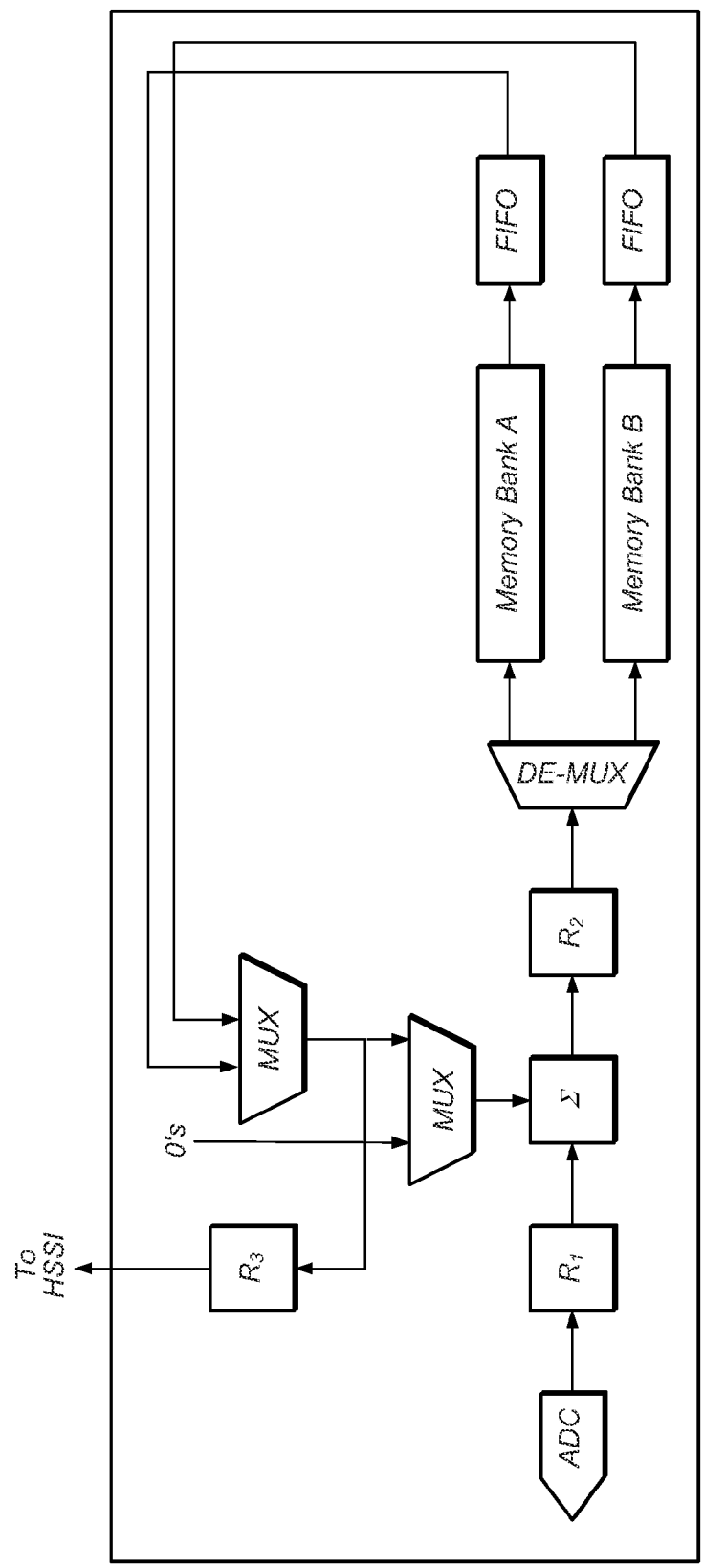
FIG. 13 is a high level block diagram of a digitizer, according to one embodiment.

FIG. 13—Block Diagram of Exemplary Digitizer

FIG. 13 is a high level block diagram representing an exemplary digitizer, according to one embodiment. The exemplary digitizer of FIG. 13 may be suitable for implementing embodiments of method 4, described above.

As shown, the digitizer may include an ADC (Analog to digital converter), for digitizing received analog waveform signals, as well a various temporary data registers, R1, R2, and R3 (so labeled), which may be used to pipeline waveform data a number of cycles with the intention of correctly aligning phases of different streams of data, e.g., aligning the data from the ADC with the stream of data coming from the memory banks. As also shown, interposed between R1 and R2 is a summing node, indicated by a summation symbol Σ, which, in a digitizer that processes N samples in parallel, may represent N parallel fast adders. A de-MUX (de-multiplexer) process or element, De-MUX, is shown interposed between R2 and memory banks A and B, each of which is further coupled to a respective FIFO (first in/first out) component. Output data from the summing node may be written to memory bank A and memory bank B, alternating in units of a waveform chunk.

The memory banks A and B represent the memory used to store the accumulated waveform. Usually this memory is single port; however, for an ASIC implementation, the input and output data paths may be separated. Practical implementations of the memory may impose a latency constraint, where the latency is the time it takes for an operation to take place after it has been requested. In particular, the latency of read operations may be an important consideration.

The FIFOs shown are temporary storage for read data from the respective memory banks. In order to compensate for the memory latency, the required data may need to be read ahead of time and stored in these FIFOs. In some embodiments, the FIFOs may be implemented with flip-flops, although other implementations may be used as desired.

As FIG. 13 also shows, a (e.g., first) multiplexer (MUX) may be coupled to the summing node. When the first record of an accumulated waveform is acquired, it needs to be stored without modification (other than possibly adjusting for the number of bits of the sample representation). This is represented in the diagram as summing with zero. On subsequent records, the current accumulated result may be summed with the incoming data to calculate the new accumulated result. Because the data are stored in both banks of memory, alternating in units of waveform chunks, a second multiplexer may alternate accordingly to get the correct data from the FIFOs at the output of the memory banks.

Note that the output of R3 is shown being provided to a High Speed Serial Interface (HSSI). As mentioned in the description of method 4, the output of the second multiplexer represents the latest accumulated result (not including the current waveform). This fact allows method 4 to stream partial results as needed to an external device (such as an FPGA with memory to hold the results). In addition, if the implementation of the (3 to 1) MUX is such that the first level selects between the two FIFOs and the second level selects between the output of the first mux and zero, and the output to HSSI is taken from the first mux level, then it is possible to read the final result of the waveform accumulation at the same time as the first record of the next accumulation operation is written to memory. This may reduce the dead time between accumulation operations to zero, or close to zero.

The HSSI port may be connected to an ASIC or FPGA (or other programmable hardware element) with enough internal/external memory to hold the data and sustain the bandwidth of the HSSI stream. This hardware may then be able to stream this data to the host system through the system bus. If the compression of the data is high enough this method may provide data to the host as fast as possible with (effectively) zero inter-accumulation operation dead time.

FIGS. 14A-14D illustrate an embodiment wherein, after accumulating a first waveform set, the method starts the accumulation of a second waveform set while concurrently streaming the result of the accumulation of the waveform set through an HSSI port, e.g., as per the exemplary digitizer of FIG. 13.

Figure 14A:
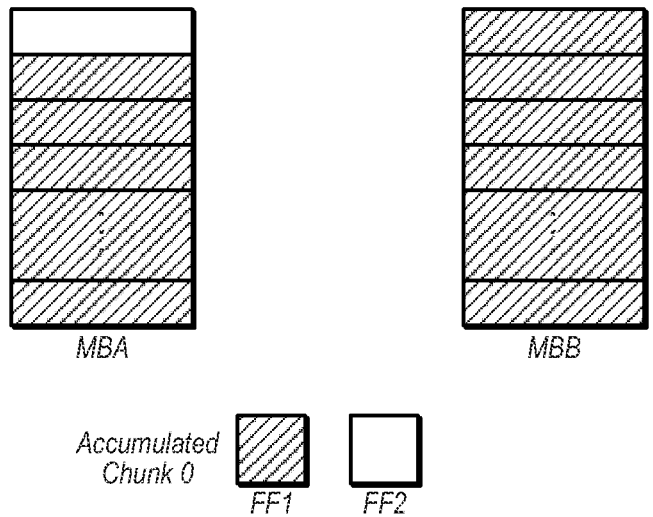
FIGS. 14A-14D illustrate concurrent accumulation and streaming of waveform data, according to one embodiment.

FIG. 14A illustrates the state of the system after the accumulation of the first waveform set is complete, according to one exemplary embodiment. The first chunk of the accumulated waveform record is stored in the first FIFO, FF1. This is a result of the pre-fetch operation performed by the system when the last chunk of the last waveform of the waveform set was stored in the second memory bank, MBB.

Figure 14B:
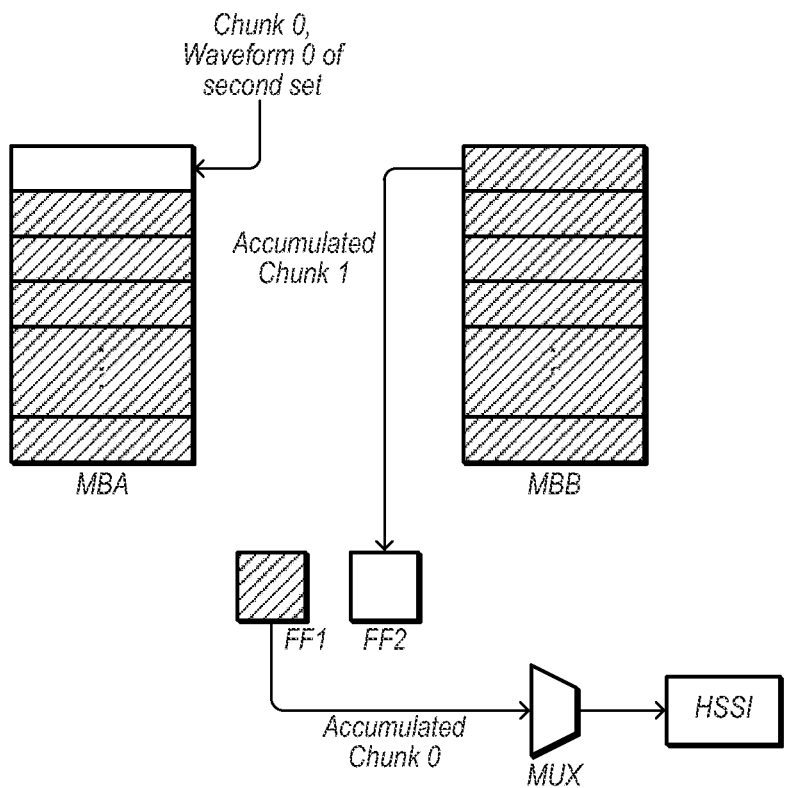

FIG. 14B shows the first chunk of the first waveform of the second waveform set being stored in the first buffer of the first memory bank. Concurrently the second chunk of the accumulated record is copied to the second FIFO, and concurrently the first chunk of the accumulated record is streamed to the HSSI.

Figure 14C:
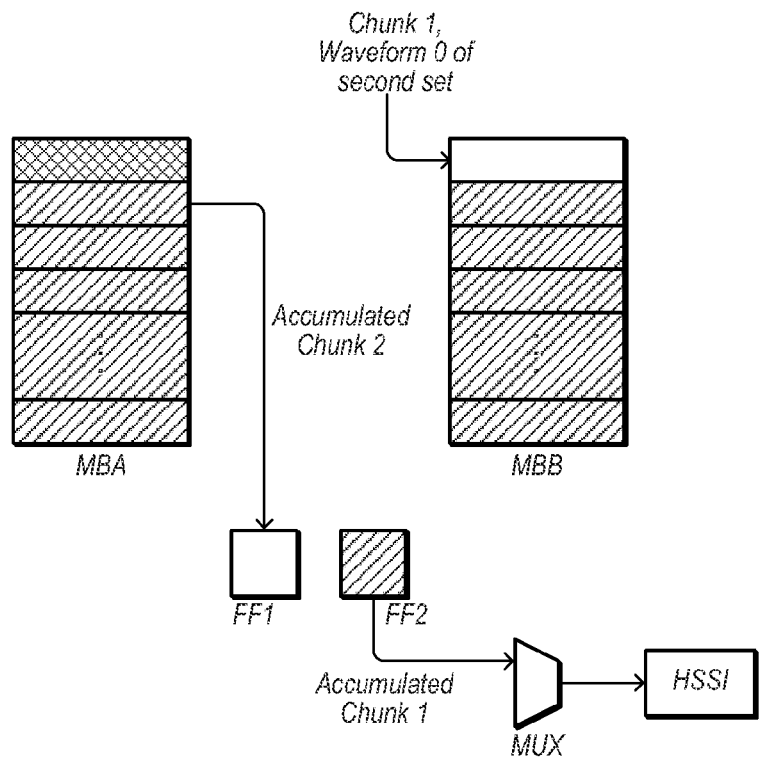

FIG. 14C shows the second chunk of the first waveform of the second waveform set being stored in the first buffer of the second memory bank. Concurrently the third chunk of the accumulated record is copied to the first FIFO, and concurrently the second chunk of the accumulated record is streamed to the HSSI.

Figure 14D:
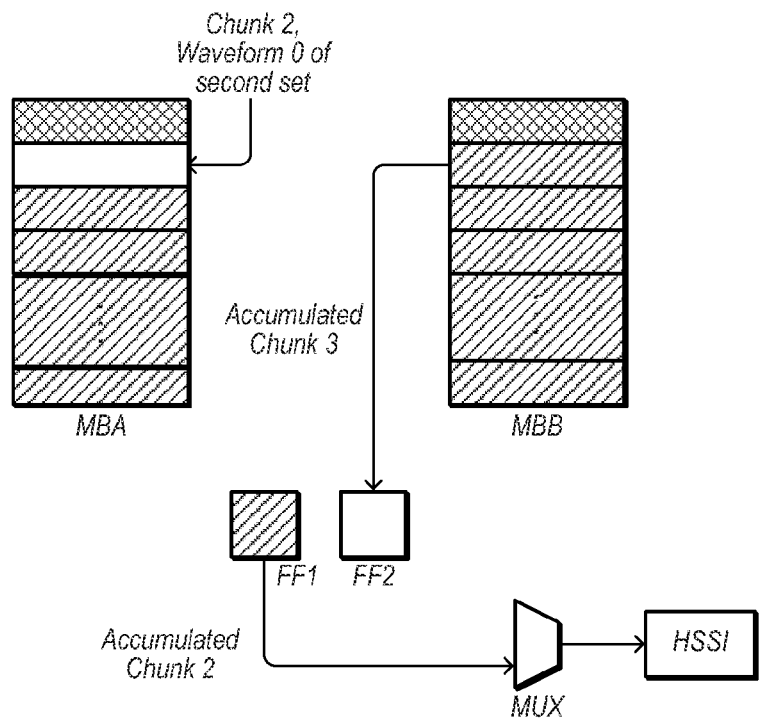

FIG. 14D shows the third chunk of the first waveform of the second waveform set being stored in the second buffer of the first memory bank. Concurrently the fourth chunk of the accumulated record is copied to the second FIFO, and concurrently the third chunk of the accumulated record is streamed to the HSSI.

This process may repeat until the last chunk of the first waveform of the second waveform set has been stored in the memory banks. At this point the complete accumulated record has been streamed to the HSSI, and the first FIFO holds now the first chunk of the first waveform of the second waveform set. The system is ready to receive the second waveform of the second waveform set and start the accumulation process again.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A system for accumulating waveform data, the system comprising:
a digitizer, comprising:
a circuit;
a first memory bank, coupled to the circuit; and
a second memory bank, coupled to the circuit;
wherein the circuit is configured to:
a) store a first subset of the waveforms in the first memory bank;
b) accumulate each waveform of the first subset of waveforms in a chunk-wise manner, wherein each chunk has a specified size, thereby generating a first bank sum comprising a first partial accumulation of the set of waveforms;
c) store a second subset of waveforms in the second memory bank concurrently with b);
d) accumulate each waveform of the second subset of waveforms in a chunk-wise manner, thereby generating a second bank sum comprising a second partial accumulation of the set of waveforms; and
wherein the first and second partial accumulations of the set of waveforms are useable to generate an accumulated record of the set of waveforms.

2. The system of claim 1, wherein the circuit is further configured to:
e) accumulate the first and second bank sums into a running accumulation of the set of waveforms;
f) repeat a)-e) for successive further first and second subsets of the set of waveforms, thereby generating an accumulated record of the set of waveforms.

3. The system of claim 2, wherein to perform e), the circuit is configured to:
store the bank sums in reserved space in the first and/or second memory banks;
wherein e) is performed using the reserved space.

4. The system of claim 1, wherein the circuit is further configured to:
transfer the bank sums to a host computer using a host computer bus, and store the bank sums in host computer memory;
wherein the host computer is configured to:
e) accumulate the first and second bank sums into a running accumulation of the set of waveforms;
f) repeat a)-e) for successive further first and second subsets of the set of waveforms, thereby generating an accumulated record of the set of waveforms.

5. The system of claim 1, wherein the circuit comprises a programmable hardware element.

6. The system of claim 5, wherein the first and second memory banks are integrated into the programmable hardware element.

7. The system of claim 1, wherein the circuit comprises an application specific integrated circuit (ASIC).

8. The system of claim 7, wherein the first and second memory banks are integrated into the ASIC.

9. The system of claim 1, wherein the first and second memory banks are integrated into the circuit.

10. The system of claim 1, wherein the first and second memory banks are external to the circuit.

11. A hardware implemented method for accumulating waveform data, the method comprising:
a digitizer performing:
a) storing a first subset of the waveforms in a first memory bank of the digitizer;
b) accumulating each waveform of the first subset of waveforms in a chunk-wise manner, wherein each chunk has a specified size, thereby generating a first bank sum comprising a first partial accumulation of the set of waveforms;
c) concurrently with b), storing a second subset of waveforms in a second memory bank of the digitizer;
d) accumulating each waveform of the second subset of waveforms in a chunk-wise manner, thereby generating a second bank sum comprising a second partial accumulation of the set of waveforms;
wherein the first and second partial accumulations of the set of waveforms are useable to generate an accumulated record of the set of waveforms.

12. The method of claim 11, further comprising:
the digitizer performing:
e) accumulating the first and second bank sums into a running accumulation of the set of waveforms;
f) repeating a)-e) for successive further first and second subsets of the set of waveforms, thereby generating an accumulated record of the set of waveforms.

13. The method of claim 12, further comprising:
the digitizer performing:
storing the bank sums in reserved space in the first and/or second memory banks;
wherein e) is performed using the reserved space.

14. The method of claim 11, further comprising:
the digitizer performing:
transferring the bank sums to a host computer using a host computer bus and DMA, and storing the bank sums in host computer memory;
e) accumulating, via the host computer, the first and second bank sums into a running accumulation of the set of waveforms; and
f) repeating a)-e) for successive further first and second subsets of the set of waveforms, thereby generating an accumulated record of the set of waveforms.

15. The method of claim 11, wherein a)-d) are performed by a circuit of the digitizer.

16. The method of claim 15, wherein the circuit comprises a programmable hardware element.

17. The method of claim 15, wherein the circuit comprises an application specific integrated circuit (ASIC).

18. The method of claim 15, wherein the first and second memory banks are integrated into the circuit.

19. The method of claim 15, wherein the first and second memory banks are external to the circuit.

* * * * *